United States Patent [19]

Gouge

[11] Patent Number: 5,267,328
[45] Date of Patent: Nov. 30, 1993

[54] METHOD FOR SELECTING DISTINCTIVE PATTERN INFORMATION FROM A PIXEL GENERATED IMAGE

[76] Inventor: James O. Gouge, 1994 Hillcrest Dr., Snellville, Ga. 30278

[21] Appl. No.: 649,681

[22] Filed: Jan. 28, 1992

Related U.S. Application Data

[63] Continuation-in-part of Ser. No. 468,097, Jan. 22, 1990, abandoned.

[51] Int. Cl.$^5$ .............................................. G06K 9/48
[52] U.S. Cl. ........................................ 382/16; 382/21; 382/22; 382/37
[58] Field of Search ...................... 382/10, 16, 19, 21, 382/22, 30, 37

[56] References Cited

U.S. PATENT DOCUMENTS

| | | | |
|---|---|---|---|
| 3,587,046 | 6/1971 | Tanaka et al. | 340/146.3 |
| 4,872,203 | 10/1989 | Asai et al. | 382/4 |
| 4,953,228 | 8/1990 | Shigemitsu et al. | 382/22 |

FOREIGN PATENT DOCUMENTS

| | | | |
|---|---|---|---|
| 0294716 | 12/1988 | European Pat. Off. | 382/10 |
| 0059374 | 5/1981 | Japan | 382/16 |

Primary Examiner—David K. Moore
Assistant Examiner—Andrew W. Johns
Attorney, Agent, or Firm—Malin, Haley, DiMaggio & Crosby

[57] ABSTRACT

This invention describes methods and apparatus for the radial extraction and pattern recognition of image information based on "back scatter" produced by focused beam of energy such as those used in radar, sonar, and ultrasound. This invention includes methods for line and geometric pattern extraction and recognition from an image based on a pixel array. In the present invention, the information obtained from "back scatter" energy extracted and encoded by the radial extraction algorithms becomes determinants to be used either individually or in concert with each other depending upon the application and desired function. The line and geometric pattern algorithms can be used to process any type of image. These algorithms which extract and encode the patterns contained in the "back scatter" and geometric shapes contained in images are unique and provide an evaluation of various multidimensional aspects of groups of pixels in the resultant image. In addition, these algorithms are not based upon strict mathematical concepts but are rather translated to the computer in terms of bit strings which require very little processing time. The disclosed methods are designed for efficient image processing in real time on PC-type computer equipment.

9 Claims, 21 Drawing Sheets

| RADIAL | PATTERN GENERATED | ACCUMULATED STRING | EDGES FOUND |
|---|---|---|---|
| 1 | 1 | 1 | 1 |
| 2 | 1 | 11 | 2 |
| 3 | 1 | 111 | 3 |
| 4 | 001 | 001111 | 4 |
| 5 | 1 | 1001111 | 5 |
| 6 | 1 | 11001111 | 6 |
| 7 | 1 | 111001111 | 7 |
| 8 | 1 | 1111001111 | 8 |

| TARGET PIXEL GRAY SCALE | SELECTED PIXEL GRAY SCALE | ABSOLUTE DIFFERENCE | ACCUMULATED DIFFERENCE |
|---|---|---|---|
| 9 | 6 | 3 | 3 |
| 9 | 6 | 3 | 6 |
| 9 | 8 | 1 | 7 |
| 9 | 10 | 1 | 8 |
| 9 | 11 | 2 | 10 |
| 9 | 11 | 2 | 12 |
| 9 | 8 | 1 | 13 |
| 9 | 6 | 3 | 16 |

FIG.7

CALCULATED ABSOLUTE UNSIGNED DIFFERENCE     ACCUMULATED ABSOLUTE UNSIGNED DIFFERENCE

| 11 − 6 = 5 | RADIAL 1 | 5 |
| 9 − 6 = 3 | & | 8 |
| 7 − 5 = 2 | RADIAL 5 | 10 |

| 11 − 6 = 5 | RADIAL 2 | 15 |
| 13 − 7 = 6 | & | 21 |
| 9 − 7 = 2 | RADIAL 6 | 23 |

| 8 − 8 = 0 | RADIAL 3 | 23 |
| 7 − 7 = 0 | & | 23 |
| 6 − 6 = 0 | RADIAL 7 | 23 |

| 9 − 6 = 3 | RADIAL 4 | 26 |
| 9 − 5 = 4 | & | 30 |
| 10 − 3 = 7 | RADIAL 8 | 37 |

ASYMMETRY = 37

FIG.9

| SELECTED RADIAL | OLD SUM | NEW SUM | ABSOLUTE DIFFERENCE | ACCUMULATED GRADIENT |
|---|---|---|---|---|
| 1 | 0 | 17 | N/A | 0 |
| 2 | 17 | 20 | 3 | 3 |
| 3 | 20 | 21 | 1 | 4 |
| 4 | 21 | 28 | 7 | 11 |
| 5 | 28 | 27 | 1 | 12 |
| 6 | 27 | 33 | 6 | 18 |
| 7 | 33 | 21 | 12 | 30 |
| 8 | 21 | 14 | 7 | 37 |

GRADIENT = 37

| SELECTED RADIAL X/Y | RADIAL AVERAGE | NEW RADIAL X/Y | DIRECTION CHANGE Y/N | STRING LENGTH | ACCUMULATED BIT STRING |
|---|---|---|---|---|---|
| 17/3 | 9.25 | 16/4 | N | 1 | 0 |
| 16/4 | 9.25 | 15/5 | N | 2 | 00 |
| 15/5 | 9.0 | 14/6 | N | 3 | 000 |
| 14/6 | 9.0 | 13/7 | N | 4 | 0000 |
| 13/7 | 9.0 | 12/8 | N | 5 | 00000 |
| 12/8 | 9.25 | 11/9 | N | 6 | 000000 |
| 11/9 | 10.0 | 10/10 | N | 7 | 0000000 |
| 10/10 | 10.5 | 9/11 | N | 8 | 00000000 |
| 9/11 | 10.5 | 8/12 | N | 9 | 000000000 |
| 8/12 | 9.25 | 9/12 | Y | 10 | 1000000000 |

DIRECTION CHANGE IS GREATER THAN OR EQUAL TO 90 DEGREES THUS START NEW LINE

| SELECTED RADIAL X/Y | RADIAL AVERAGE | NEW RADIAL X/Y | DIRECTION CHANGE Y/N | STRING LENGTH | ACCUMULATED BIT STRING |
|---|---|---|---|---|---|
| 9/12 | 9.0 | 10/12 | N | 1 | 0 |
| 10/12 | 9.0 | 11/12 | N | 2 | 00 |
| 11/12 | 9.5 | 12/12 | N | 3 | 000 |

FIG.16

| LINE X/Y | LINE COUNT | LINE LENGTH | DIRECTION CHANGES | ACCUMULATED BIT PATTERN |
|---|---|---|---|---|
| 9/8 | 0 | 0 | 0 | N/A |
| 8/6 | 0 | 1 | 1 | 1 |
| 7/6 | 0 | 2 | 2 | 11 |
| 7/7 | 0 | 3 | 3 | 111 |
| 6/7 | 0 | 4 | 4 | 1111 |
| 6/8 | 0 | 5 | 4 | 01111 |
| 8/9 | 0 | 6 | 5 | 101111 |
| 6/10 | 0 | 7 | 6 | 1101111 |
| 6/22 | 0 | 8 | 7 | 11101111 |
| 7/12 | 0 | 9 | 8 | 111101111 |
| 8/12 | 0 | 10 | 8 | 0111101111 |
| 9/12 | 0 | 11 | 9 | 10111101111 |
| 10/12 | 0 | 12 | 10 | 110111101111 |
| 12/11 | 0 | 13 | 11 | 1110111101111 |
| 12/10 | 0 | 14 | 12 | 11110111101111 |
| 12/9 | 0 | 15 | 12 | 011110111101111 |
| 12/8 | 0 | 16 | 13 | 1011110111101111 |
| 12/7 | 0 | 17 | 14 | 11011110111101111 |
| 11/7 | 0 | 18 | 15 | 111011110111101111 |
| 11/6 | 0 | 19 | 16 | 1111011110111101111 |
| 10/6 | 0 | 20 | 16 | 01111011110111101111 |
| 9/6 | 1 | 20 | 16 | 01111011110111101111 |

FIG.19

| LINE X/Y | LINE COUNT | LINE LENGTH | DIRECTION CHANGES | ACCUMULATED BIT PATTERN |
|---|---|---|---|---|
| 6/6 | 0 | 0 | 0 | N/A |
| 7/6 | 0 | 1 | 0 | 0 LINE 1 EXTRACTION |
| 8/6 | 0 | 2 | 0 | 00 |
| 9/6 | 0 | 3 | 1 | 100 |
| 10/6 | 0 | 4 | 2 | 1100 |
| 11/6 | 1 | 5 | 3 | 11100 |
| 11/7 | 1 | 1 | 0 | 0 LINE 2 EXTRACTION |
| 11/8 | 1 | 2 | 0 | 00 |
| 11/9 | 1 | 3 | 1 | 100 |
| 11/10 | 1 | 4 | 2 | 1100 |
| 11/11 | 2 | 5 | 3 | 11100 |
| 10/11 | 2 | 1 | 0 | 0 LINE 3 EXTRACTION |
| 9/11 | 2 | 2 | 0 | 00 |
| 8/11 | 2 | 3 | 1 | 100 |
| 7/11 | 2 | 4 | 2 | 1100 |
| 6/11 | 3 | 5 | 3 | 11100 |
| 6/10 | 3 | 1 | 0 | 0 LINE 4 EXTRACTION |
| 6/9 | 3 | 2 | 0 | 00 |
| 6/8 | 3 | 3 | 1 | 100 |
| 6/7 | 3 | 4 | 2 | 1100 |
| 6/6 | 4 | 5 | 3 | 11100 |

FIG.21

| LINE X/Y | LINE COUNT | LINE LENGTH | DIRECTION CHANGES | ACCUMULATED BIT PATTERN |
|---|---|---|---|---|
| 9/5 | 0 | 0 | 0 | N/A |
| 10/6 | 0 | 1 | 0 | 0 LINE 1 EXTRACTION |
| 11/7 | 0 | 2 | 0 | 00 |
| 12/8 | 0 | 3 | 1 | 100 |
| 13/9 | 0 | 4 | 2 | 1100 |
| 14/10 | 1 | 5 | 3 | 11100 |
| 13/10 | 1 | 1 | 0 | 0 LINE 2 EXTRACTION |
| 12/10 | 1 | 2 | 0 | 00 |
| 11/10 | 1 | 3 | 0 | 000 |
| 10/10 | 1 | 4 | 0 | 0000 |
| 9/10 | 1 | 5 | 0 | 00000 |
| 8/10 | 1 | 6 | 0 | 000000 |
| 7/10 | 1 | 7 | 0 | 0000000 |
| 6/10 | 1 | 8 | 1 | 10000000 |
| 5/10 | 1 | 9 | 2 | 110000000 |
| 4/10 | 2 | 10 | 3 | 1110000000 |
| 5/9 | 2 | 1 | 0 | 0 LINE 3 EXTRACTION |
| 6/8 | 2 | 2 | 0 | 00 |
| 7/7 | 2 | 3 | 1 | 100 |
| 8/6 | 2 | 4 | 2 | 1100 |
| 9/5 | 3 | 5 | 3 | 11100 |

FIG.23

METHOD FOR SELECTING DISTINCTIVE PATTERN INFORMATION FROM A PIXEL GENERATED IMAGE

This application is a continuation-in-part of Ser. No. 07/468,097, filed Jan. 22, 1990 abandoned.

BACKGROUND OF THE INVENTION

1. Field of the Invention

This invention relates generally to a method and apparatus for extracting information from the gray scale image containing "back scatter" energy generated by a focused beam of energy (ultrasound, radar, sonar) striking an echoic surface target. Ultrasound imaging of a target such as human tissue is utilized to recognize and identify the resultant echoic characteristics of the target. Specifically the invention relates to a method and apparatus for inexpensively extracting significant image information based on edges, lines, contours and geometrical shapes from an image containing back scatter image patterns in real time.

2. Description of the Prior Art

The use of ultrasonic energy producing echoic information concerning the health and well being of body organs and tissues is well known. Gray scale echography which provides characteristics of tissue texture in a visual image display representative of tissue and cell differences due to disease or lesions is also known. A beam of focused ultrasonic energy on a tissue target produces parameters with respect to the tissue including attenuation and back scattering. A complete discussion of texture and tissue echograms can be found in the Journal of Ultrasound Medicine Volume 9, pages 215-229, 1990.

The present invention deals with echoic back-scatter information as well as geometric line and shape information which are contained in a processed image in a visual x and y coordinate system on a cathode ray tube as a function of visually reproduced pixels. In particular, computerized image processing and visual image processing including pattern extraction and recognition is known. U.S. Pat. No. 4,769,850 issued to Itoh et al Sep. 6, 1988 shows an apparatus for extracting circular and linear components in a complex computerized image. Likewise U.S. Pat. No. 4,866,783 issued to Ohyama Sep. 12, 1989 shows a system for detecting edges of an image which includes a scanning circuit and other components for evaluating the image. U.S. Pat. No. 4,817,171 issued to Stentiford Mar. 28, 1989 shows a pattern recognition system for syntactic decision processing.

U.S. Pat. No. 4,908,872 issued to Toriu et al Mar. 13, 1990 shows a method and apparatus for extracting contour lines from a pattern obtained in image processing using vector gradients for comparing gray level gradients among adjacent pixels. To date, the primary problem with the prior art systems are the mathematical complexity and the time and computing power required for extracting relevant image information cost effectively in real time. Using current image processing methods, geometric pattern extraction and recognition is extremely complex and a multi-step mathematical process which requires the power of a super computer to process images in real time.

With respect to the ultrasonic imaging of target tissue, the interaction between the "back scatter" and the primary returning energy causes variations in the intensity of the primary returning energy which shows up in the resultant image as a textured surface with gray scale brightness differences represented by the pixel array relating to the relative intensity of the returning energy from the target at specific x and y positions. The present invention, for example, can be used for example to analyze an image produced by the ultrasonic scanning of a thin, planar area of tissue located within the focal length of the ultrasonic emitter. The invention analyzes the multidimensional patterns contained in the back scatter and the geometrical lines and shapes, i.e. geometrical patterns; all of which are contained in the image produced by the scanning energy beam. Topographical variations appear as the gray scale pixel luminence intensity variations distributed across the image area presented.

The present invention discloses a method and apparatus using personal sized computers such as an IBM PC, to provide real time image analysis and evaluation to discern relevant information patterns in the back scatter component of the image for differentiating cells and tissues which heretofore were not discernible without a super computer or invasive surgery accomplished at a resolution level to ensure the reliability of the procedure.

The present invention provides a less complex technique for complex image processing by a novel examination of predetermined target pixel radials extending from the target pixel for analysis of surrounding pixel gray scale value variations between the target pixel and neighboring near and far pixels surrounding the target pixel.

BRIEF SUMMARY OF THE INVENTION

The invention described herein is a method and apparatus for evaluating back scatter energy components contained in images which form complex image patterns by examining near and far pixels surrounding a target pixel radially as a function of edges, lines and contours relative to radial pixels and their gray scale values. Use of this information is then employed for line extraction, shape extraction and shape recognition through the use of resultant accumulated bit strings relating to the pixel edges, lines and contours around the target pixel as a function of various derivative bit string information. The resultant bit string information can then be compared with an accumulated data base of back scatter patterns to produce useful distinctions between critical areas of cells and tissue differences within a target group.

It is an object of this invention to provide an image processing method for edge, line and contour pattern extraction from a complex image containing back scatter patterns in real time using a "small" personal computer.

It is another object of this invention to provide image and pattern recognition in a complex image in a cost effective apparatus and method.

Yet another object of this invention is to provide for extracting of information from back scatter energy intensity variations produced by a beam of ultrasonic energy scanning tissue cells for tissue cell evaluation in a non-complex, cost-effective, real time process and apparatus.

In accordance with these and other objects which will be apparent hereinafter, the instant invention will now be described with particular reference to the accompanying drawings.

BRIEF DESCRIPTION OF THE DRAWINGS

FIG. 7 shows radial contour calculation diagram relating to the flow diagram of FIG. 6.

FIG. 9 shows radial asymmetry calculation diagram for the flow diagram of FIG. 8 including the resultant accumulated differences.

FIG. 16 shows line extraction calculations related to FIGS. 12, 13, 14 and 15.

FIG. 19 shows a circle shape calculation diagram for processing each pixel contained in the perimeter of a circle shown in FIG. 18 by geometric shape extraction and the resultant accumulated bit string.

FIG. 21 shows a square shape calculation diagram based on the diagram shown in FIG. 20 for a geometric shape extraction and resultant accumulated bit strings.

FIG. 23 shows the pixel processing triangular shape calculation diagram for pixel processing of the diagram shown in FIG. 22 and the resultant accumulated bit strings.

DESCRIPTION OF THE PREFERRED EMBODIMENT OF THE INVENTION

Figure 1:
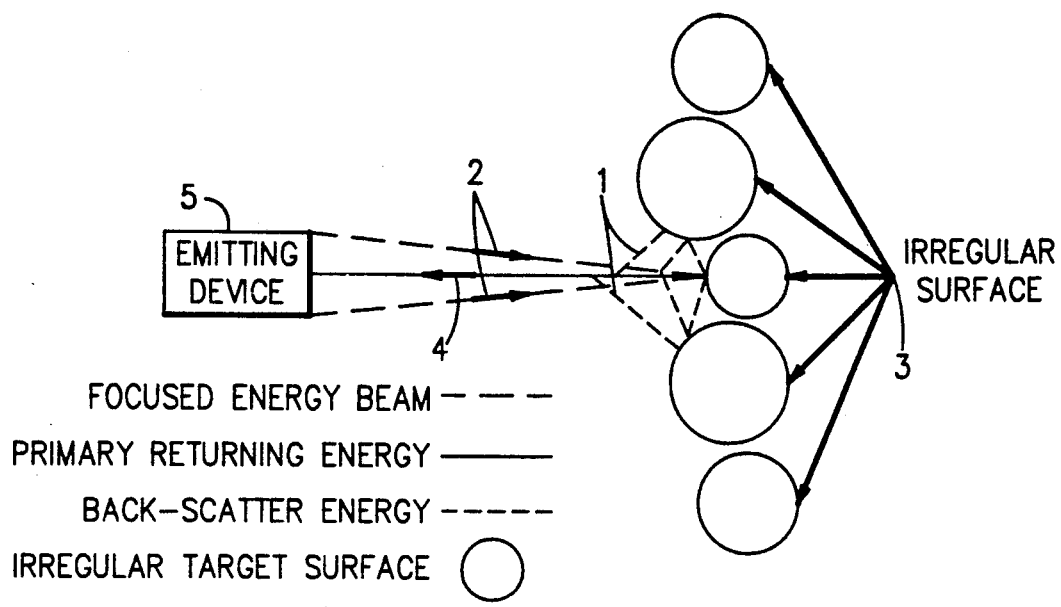
FIG. 1 shows a schematic diagram of back scatter energy from a focused beam of energy striking an irregular echoic surface.

Referring now to the drawings, FIG. 1 shows a schematic diagram which has an ultrasonic emitting device probe 5 which bombards the irregular surface (which could be tissue) to obtain a return echo of intensity 4 based on the direct beam of energy 2 striking the target causing an interaction of the reflected energy 1 with the returning beam 2. Although the returning energy based on the interaction between the back scatter (produced by the irregular surface) and the primary returning energy is not predictable it is repeatable when compared so that processing the image based on the intensity levels related by gray scale pixel values produce useful information regarding the target surface. The purpose of the invention is to process the returning energy to provide useful information relating to the characteristics of the target tissue.

Figure 2:
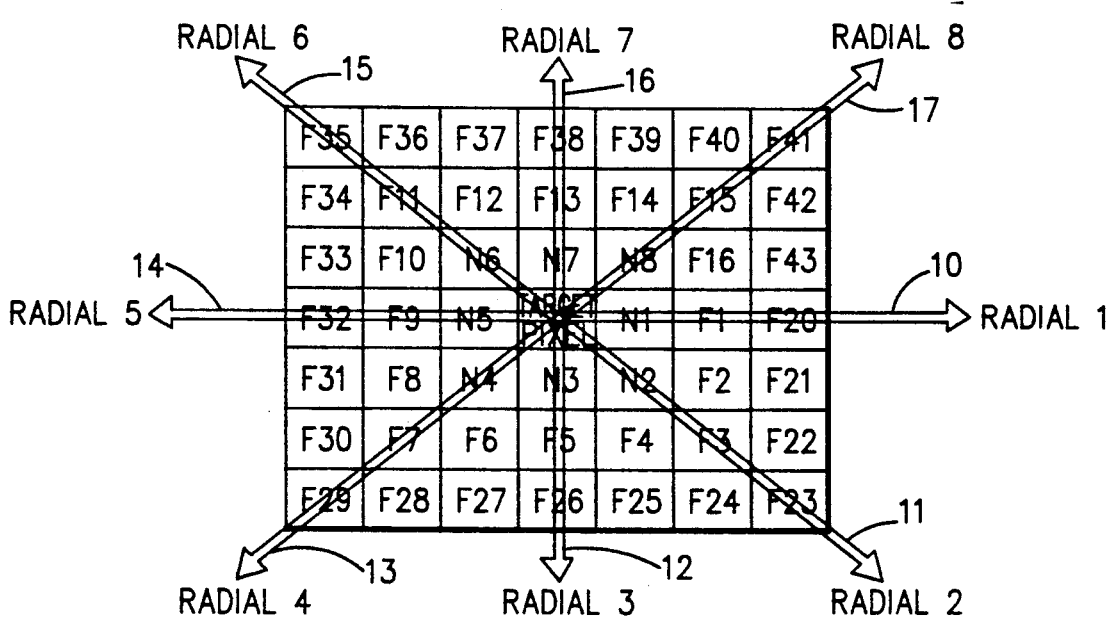
FIG. 2 shows a diagram of near and far neighboring pixels surrounding a target pixel from an image for radial examination of particular near and far neighboring pixels.

Referring now to FIG. 2 the center target pixel surrounded by a first layer of pixels N1–N8 representing near neighbor pixels and two additional outer groupings of pixels surrounding in a second and third tier level from the target pixel represented by F1–F43. In utilizing the present invention a plurality of imaginary radials 1–8 numbered as elements 10–17 for clarity are selected which will be used in evaluation of the surrounding near and far neighboring pixels. These are the groups of pixels to be processed in accordance with the present invention.

Figures 3, 5:
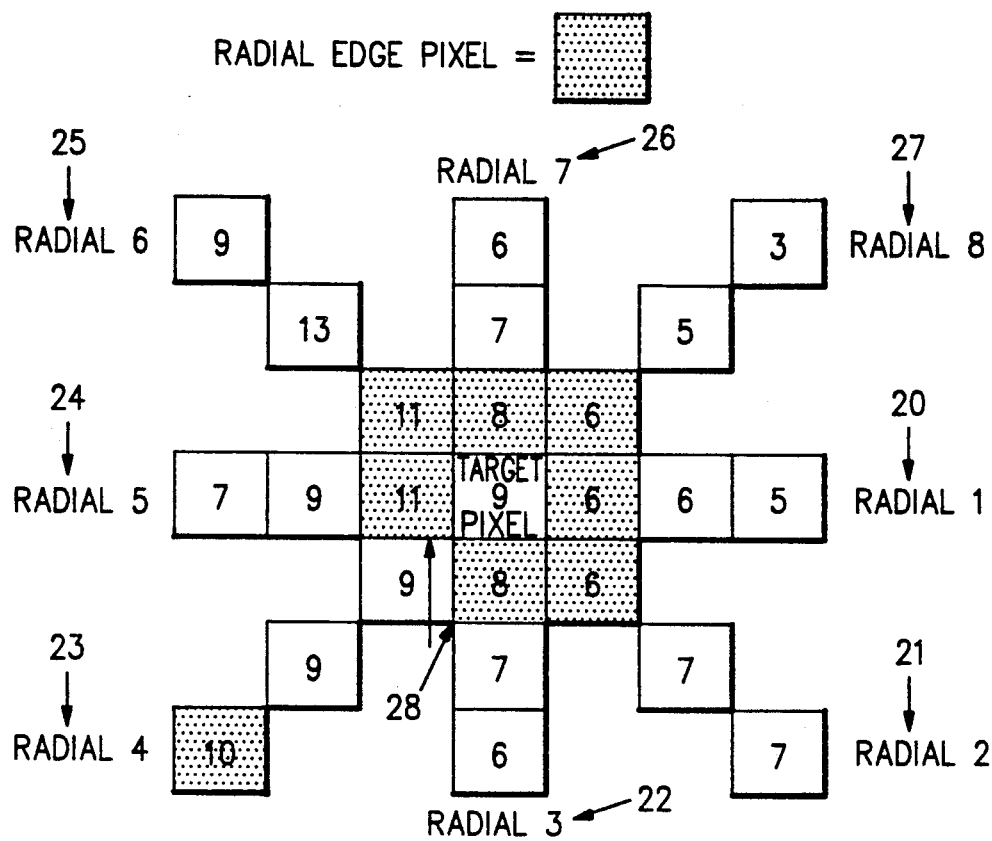
FIG. 3 shows a diagram of the gray scale value for the target pixel for the radials defined in FIG. 2 showing edges found along each radial.
FIG. 5 shows a diagram of the resultant accumulated bit string utilizing the radial shape process for the target and neighboring pixel patterns shown in FIGS. 3 and 4.

FIG. 3 shows an example of a plurality of pixels along the radial selected, each having numerical values relating to their gray scale value. The target pixel has an arbitrarily selected numerical gray scale value of 9. The purpose of this diagram is for explanation purposes only; it does not represent any true or absolute values to be found in analyzing back scatter. An edge is defined as a difference in gray scale value between the target pixel and the near or far neighboring pixels along the radial selected.

"RADIAL SHAPE EXTRACTION"

FIG. 3 shows a group of pixels from an image generated by one of the aforementioned imaging systems. The "Radial Shape Extraction" algorithm (FIG. 4) evaluates the NEAR and FAR neighboring pixels along the imaginary radials extending from the target pixel. The NEAR neighbors are the pixels directly adjacent to the target pixel. The FAR neighbors are the second and third ring of pixels surrounding the target (see FIG. 2). The algorithm shown in FIG. 4 searches each radial for an edge; i.e. a difference in gray scale value between the target pixel and the near and/or far neighbors along the radial selected (see FIG. 4 #30–37). Each edge position relative to the target is noted as a bit string which is appended to an accumulated string of bits (see FIG. 4 #38). Processing each of the eight radials (see FIG. 4 #32) as shown in all of FIG. 4 creates an accumulated string of bits analogous to the "RADIAL SHAPE" of the edges. These edge in all the radials could be considered as dots in a "connect the dots to form a shape" child's puzzle. Sequential processing by the algorithm shown in FIG. 4, of each radial shown in FIG. 3, results in the bit string sequence shown in FIG. 5.

The purpose of the "Radial Shape Extraction" algorithm is to generate a bit string pattern that is analagous to the interaction of the deflected backscatter energy with the primary returning reflected beam of energy at or near the echoic surface of the target area being imaged. The bits within said bit string have no mathematical significance but are rather a method for encoding the general geometric features of the imaginary shape created by the interaction of the aforementioned backscatter with the primary returning energy. In order to evaluate the aforementioned interaction, said bit strings might then be used as elements for the creation of a knowledge base or comparison to a prestored knowledge base made up of these bit strings.

As a general step-by-step explanation of FIG. 4, the following example will be described. The pixel gray-scale values shown in FIG. 3 will be used as the data processed in said example. FIG. 3 represents any radial pixel group within the array of pixels comprising the image to be processed.

RADIAL SHAPE EXTRACTION ALGORITHM: STEP-BY-STEP EXPLANATION (SEE FIG. 4)

Step 1

Figure 4:
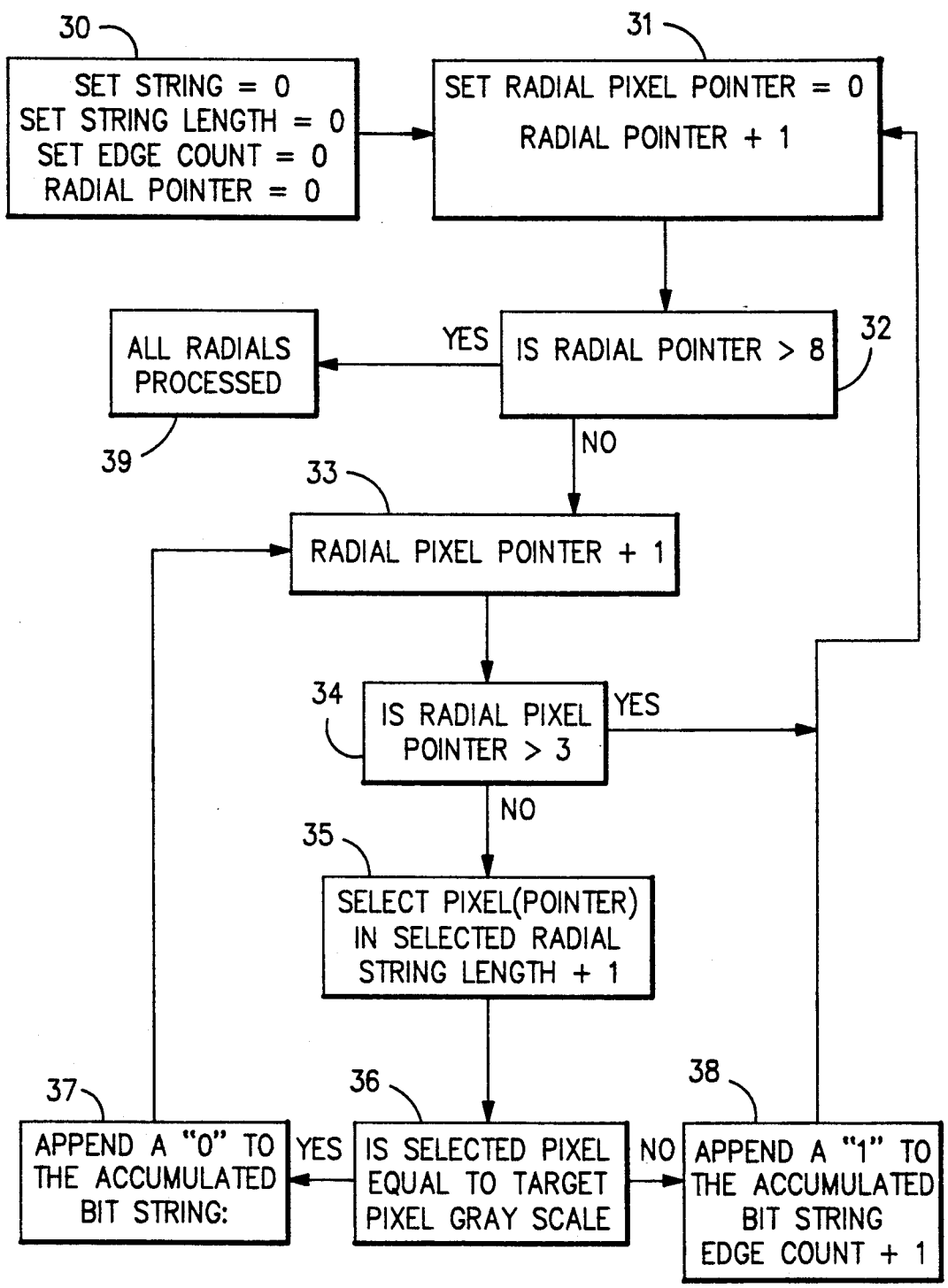
FIG. 4 shows a flow diagram for radial shape extraction used in the present invention.

In FIG. 4 #30, four program variables (string, string length, edge count, radial pointer) are initialized. The "string" (See FIG. 5) "accumulated string") variable contains the accumulated bit string produced by the algorithm in FIG. 4; the "string length" variable contains a number equal to the length of the string of bits contained in the "string" variable; the "edge count" variable contains a number equal to the number of radial edges detected (See FIG. 5 "edges found") in all radials as depicted in the bit string contained in the variable "string"; the "radial pointer" variable contains the number of the radial being processed in sequence i.e., radial 1 through radial 8.

Step 2

In FIG. 4, #31, a fifth variable "radial pixel pointer", a variable which points to the current pixel along the current radial being processed, is first initialized to zero, i.e., no radial pixel as yet. The variable, "radial pointer", mentioned in step 1, is a variable used to point to the currently selected linear group of pixels extending from the target pixel, and in this step is incremented to point to the next sequential radial to be processed.

Step 3

In FIG. 4 #32, the "radial pointer" variable is tested for greater than 8. If the test is true, all radials have been processed, indicating that execution of the algorithm is completed and one proceeds to step 10. If the test is not true, then proceed to step 4.

Step 4

In FIG. 4 #33, the "radial pixel pointer" is incremented by 1 to point to the next sequential pixel to be processed along the currently selected imaginary linear radial group of pixels extending from the target pixel.

Step 5

In FIG. 4 #34, the "radial pixel pointer" is tested for greater than 3, i.e., have all pixels along the currently selected imaginary radial group of pixels been processed? If this test is true, proceed to step 2 to prepare to process the next radial. If this test is false, proceed to step 6.

Step 6

In FIG. 4 #35, get the gray-scale value of the pixel selected by the "radial pointer" and "radial pixel pointer" and increment the "string length" variable by 1.

Step 7

In FIG. 4 #36, the gray-scale value of the target pixel is compared with the gray-scale value obtained in step 6. If they are equal proceed to step 9. If they are not equal, go to step 8.

Step 8

In FIG. 4 #38, a "1" bit is appended to the accumulated bit string variable "string" (See FIG. 5 "accumulated string"). Increment the "edge count" variable by 1 to indicate the detection of an edge along the current radial selected. Then proceed to step 2 to prepare to process the next radial.

Step 9

In FIG. 4 #37, a "0" bit is appended to the accumulated bit string variable "string". Then proceed to step 4 to prepare to process the next pixel along the currently selected radial.

Step 10

In FIG. 4 #39, all radials have been processed. The execution of the algorithm has thus been completed. The results of this process are contained in the last line of FIG. 5, i.e., a string of bits analogous to the "radial shape" of the group of pixels shown in FIG. 3.

"RADIAL SPATIAL DISTRIBUTION EXTRACTION"

The "Radial Spatial Distribution Extraction" algorithm measures the general distribution of the edges found in the near and far pixels surrounding and in reference to the target pixel. This is accomplished by simply counting the number of "0's" in the bit string generated by the "Radial Shape Extraction" algorithm. These zeroes are analogous to the distance of the edges from the target pixel. A number from 0 to 24 is calculated as an indication of the distribution and complexity of the pattern of the edges produced by the "Back Scatter". The larger the number calculated, the more widely distributed the edges; ergo, a smaller number represents a smaller "Spatial Distribution" of edges. The "Spatial Distribution" of the edge pattern produced by the "Back Scatter" is directly related to the echoic surface topography of the target being imaged.

The bit string generated by the "Radial Shape Extraction" algorithm in FIG. 5 contains eight "1" bits and two "0" bits; therefore, said bit string has a "Radial Spatial Distribution" of two.

"RADIAL CONTOUR EXTRACTION"

The "Radial Contour Extraction" algorithm measures the delta (change) in the edges identified by the "Radial Shape Extraction" algorithm. The edge delta is related to the echoic homogeneity of the target being imaged. This is accomplished by calculating the accumulated variations in edge pixel values shown in FIG. 3 using the algorithm shown in FIG. 6 #50-58. This produces a number from 0 to 248 in an image based on 32 gray scales (i.e. 0=black, 31=white). The lower the number, the MORE homogeneous the target is; ergo, the larger the number, the LESS homogeneous the target is. FIG. 7 shows the "Radial Contour Extraction" calculation diagram for the pixels identified in FIG. 3 by the "Radial Shape Extraction" algorithm. As shown in the calculation diagram in FIG. 7, the accumulated difference is 16, a number indicating echoic homogeneity.

Step 1

Figure 6:
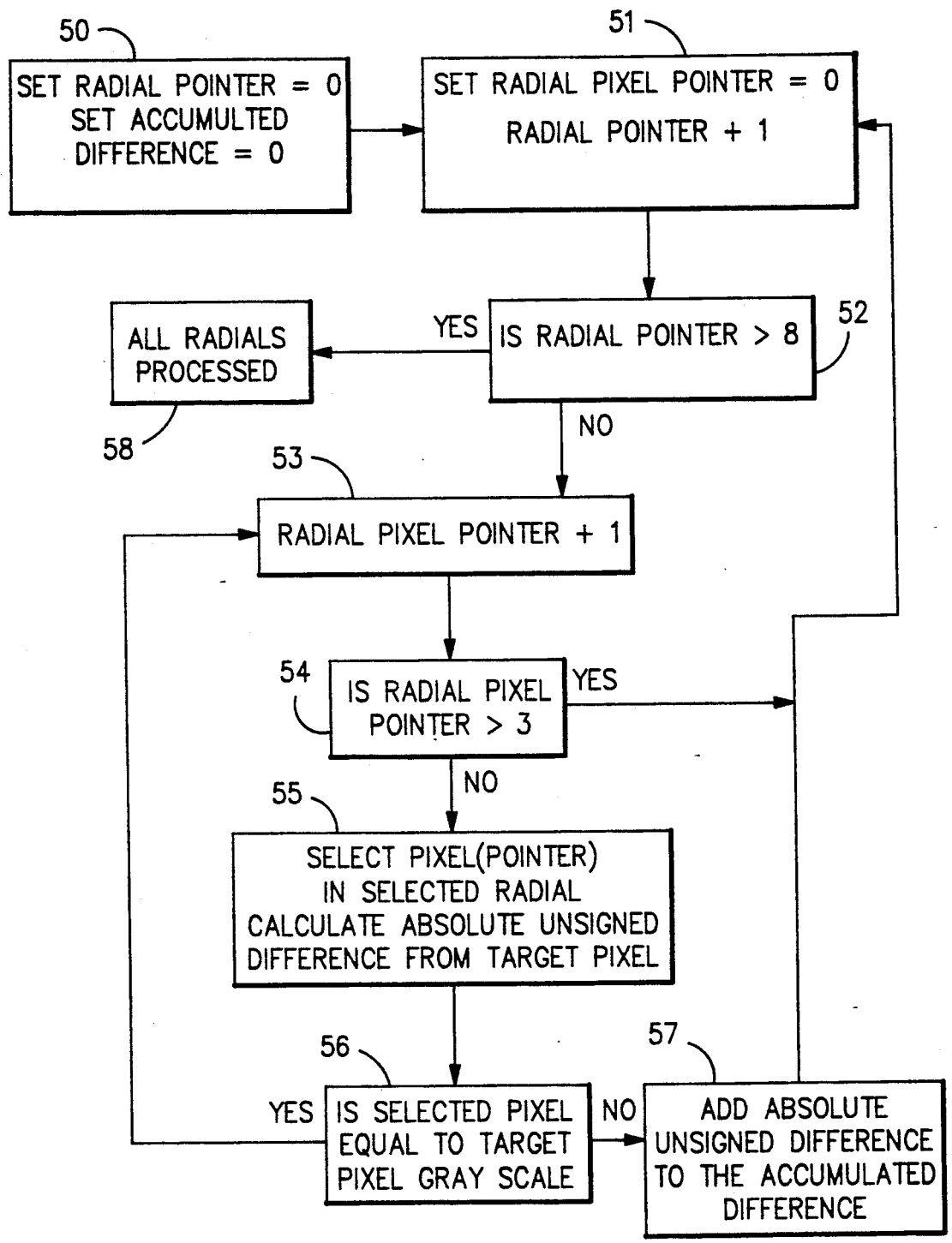
FIG. 6 shows a flow diagram for radial contour extraction utilized in the present invention.

In FIG. 6, #50, the variables "Radial Pointer" and "Accumulated Difference" are initialized to zero.

Step 2

In FIG. 6, #51, the variable "Radial Pixel Pointer" is initialized to zero and the variable "Radial Pointer" is incremented by "1".

Step 3

In FIG. 6, #52, the variable "Radial Pointer" is tested for greater than "8". If the test is true, then all radials have been processed; then proceed to step 9. Otherwise proceed to Step 4.

Step 4

In FIG. 6, #53, the variable "Radial Pixel Pointer" is incremented to "13" to select the next pixel within the currently selected radial group of pixels to be processed.

Step 5

In FIG. 6, #54, the variable "Radial Pixel Pointer" is tested for greater than "3". If the test is true, then go to Step 2 which indicates that all pixels within the currently selected radial have been processed. Otherwise, proceed to Step 6.

Step 6

In FIG. 6, #55, get the value of the pixel pointed to by the variables "Radial Pointer" (Radial Pixel Pointer)". Calculate the absolute unsigned difference between said pixel and the currently selected target pixel which resides at the center of the currently selected group of pixels.

Step 7

In FIG. 6, #56, test the results of the calculation performed in Step 6 for zero. If the test is true, then the target pixel and the pixel being processed in Step 6 are equal and therefore no edge, i.e., difference, was detected. Then proceed to Step 4 to process the next pixel in the currently selected radial. Otherwise, an edge, i.e., a difference, has been detected; therefore proceed to Step 8.

Step 8

In the FIG. 6, #57, the absolute unsigned difference calculated in Step 6 is added to the variable "Accumulated Difference". Go to Step 2 to process the next radial.

Step 9

In FIG. 6, #58 all radials have been processed and the "Radial Contour Extraction" algorithm has been completed. The results of this algorithm reside in the variable "Accumulated Difference".

"RADIAL ASYMMETRY EXTRACTION"

Figure 8:
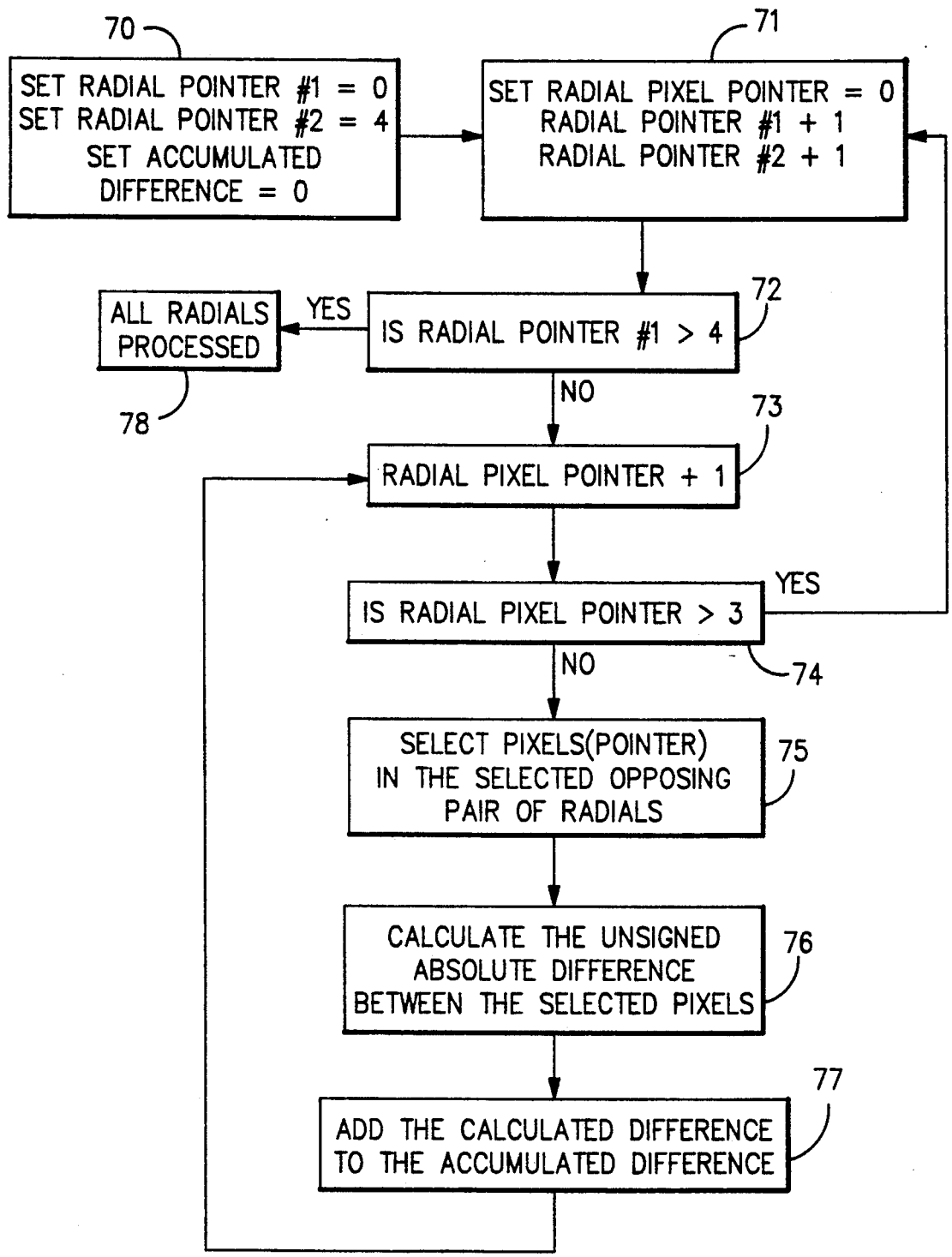
FIG. 8 shows flow diagram for radial asymmetry extraction utilized in the present invention.

The "Radial Asymmetry Extraction" algorithm shown in FIG. 8 #70-77 measures the asymmetry between opposing imaginary radial pairs extending from the target pixel. The algorithm assumes eight imaginary radials of pixels extending from the target pixel much like spokes in a wheel (see FIG. 2 #10-17). Each radial is three pixels in length (see FIG. 3 #20-27). The gray scale value of the pixels along the radials is compared with that of their counterparts and the differences are accumulated for all four radial pairs as illustrated in the "Radial Asymmetry Calculation Diagram" shown in FIG. 9. This process produces a number 12 analogous to the overall asymmetry of the pixels surrounding the target pixel and is an abstract measure of the echoic asymmetry of the target being imaged.

Step 1

In FIG. 8, #70, the variable "Radial Pointer #1" is initialized to zero and the variable "Radial Pointer #2 is initialized to "4". The variable "Accumulated Difference" is initialized to zero.

Step 2

In FIG. 8, #71, the variable "Radial Pixel Pointer" is initialized to zero. The variables "Radial Pointer #1" and "Radial Pointer #2" are incremented by "1" to select the next pair of colinear radials to be processed.

Step 3

In FIG. 8, #72, the variable "Radial Pointer #1" is tested for greater than "4". If the test is true, then all radial pairs have been processed; then proceed to Step 9. Otherwise, proceed to Step 4.

Step 4

In FIG. 8, #73, the variable "Radial Pixel Pointer" is incremented by "1" to select the next pixels in the selected pair of radials to be processed.

Step 5

In FIG. 8, #74, the variable "Radial Pixel Pointer" is tested for greater than "3". If the test is true, then all pixels within the selected radial pair have been processed; then proceed to Step 2. Otherwise, proceed to Step 6.

Step 6

In FIG. 8, #75, the Gray-scale value in each of the two opposing selected radials is read.

Step 7

In FIG. 8, #76, the absolute unsigned difference between the two selected pixels is calculated.

Step 8

In FIG. 8, #77, the results of the calculation in Step 7 is added to the variable "Accumulated Difference". Go to Step 4.

Step 9

In FIG. 8, #78, all radial pairs have been processed and the result is contained in the variable "Accumulated Difference".

"RADIAL GRADIENT EXTRACTION"

The "Radial Gradient Extraction" algorithm measures the delta (change) in gray scale from radial to radial. This algorithm assumes eight imaginary radials of pixels extending from the target pixel much like spokes in a wheel (see FIG. 2 #10-17). Each radial is three pixels in length (see FIG. 3 #20-27). The purpose of this algorithm is to measure gradual changes in echogenicity as the target being imaged is scanned by the energy beam without the need to take into consideration the scanning axis. The steps by which to measure these changes are shown in the flow diagram for the "Radial Gradient Extraction" algorithm in FIG. 10 #90-99. FIG. 11 is an example of a gradient value obtained from the gray scale values of pixels along the eight imaginary radials given in FIG. 3.

Step 1

Figure 10:
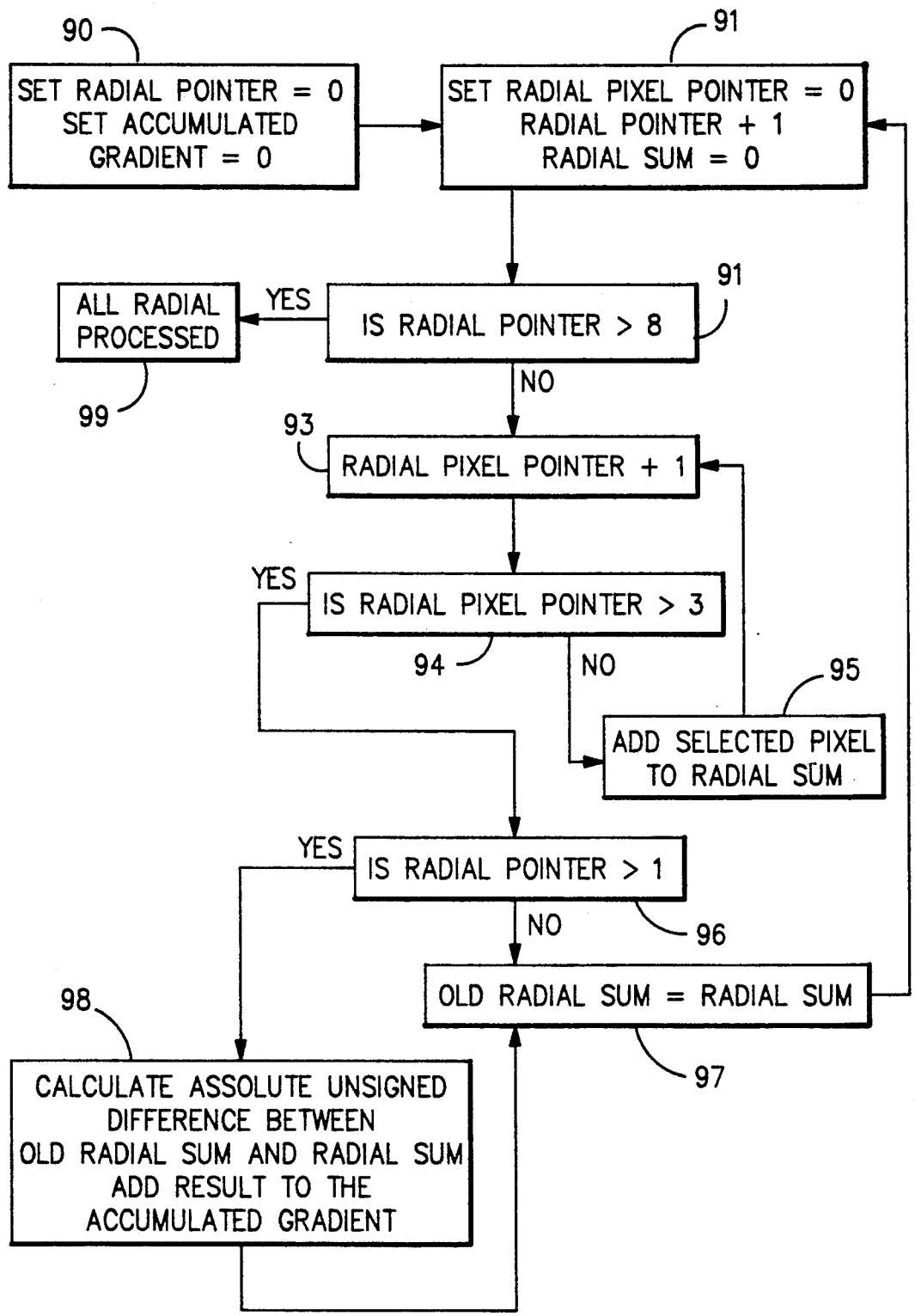
FIG. 10 shows the flow diagram for the radial gradient extraction used in the present invention.
Figures 11, 14:
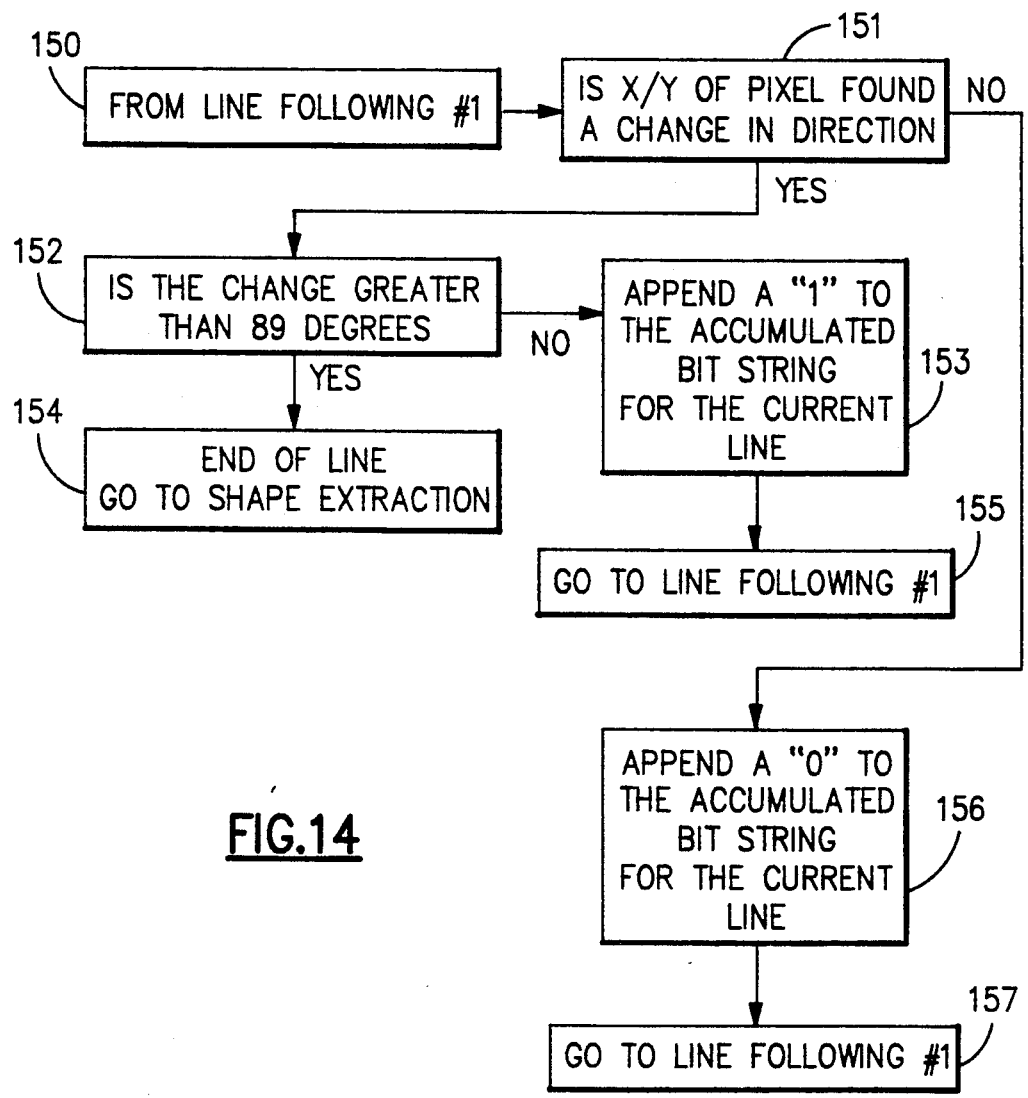
FIG. 11 shows a radial gradient calculation diagram related to the flow diagram of FIG. 10.
FIG. 14 shows the second part of the flow diagram contained in FIG. 13 related to line extraction.

In FIG. 10, #90, the variables "Radial Pixel Pointer" and "Accumulated Gradient" are initialized to zero.

Step 2

In FIG. 10, #91, the variables "Radial Pixel Pointer" and "Radial Sum" are initialized to zero. The variable "Radial Pointer" is incremented by "1" to select the next radial to be processed.

Step 3

In FIG. 10, #92, the variable "Radial Pointer" is tested for greater than "8". If the test is true, then all radials have been processed; proceed to Step 10. Otherwise, proceed to Step 4.

Step 4

In FIG. 10, #93, the variable "Radial Pixel Pointer" is incremented by "1" to select the next pixel in the selected radial to be processed.

Step 5

In FIG. 10, #94, the variable "Radial Pixel Pointer" is tested for greater than "3". If the test is true, all pixels in the selected radial have been processed; proceed to Step 7. Otherwise proceed to Step 6.

Step 6

In FIG. 10, #95, add the Gray-scale value of the selected pixel to the variable "Radial Sum" and proceed to Step 4.

Step 7

In FIG. 10, #96, the variable "Radial Pointer is tested for greater than "1". If the test is true, more than one radial has been processed; then proceed to Step 9. Otherwise, this is the first radial processed; then proceed to Step 8.

Step 8

In FIG. 10, #97, the value contained in the variable "Radial Sum" is saved in the variable "Old Radial Sum".

Step 9

In FIG. 10, #98, calculate the absolute unsigned difference between the values contained in the variables "Old Radial Sum" and "Radial Sum". Add the results of said calculation to the variable "Accumulated Gradient" and go to Step 8.

Step 10

In FIG. 10, #99, all radials have been processed and the result is contained in the variable "Accumulated Gradient".

"LINE EXTRACTION"

Figure 15:
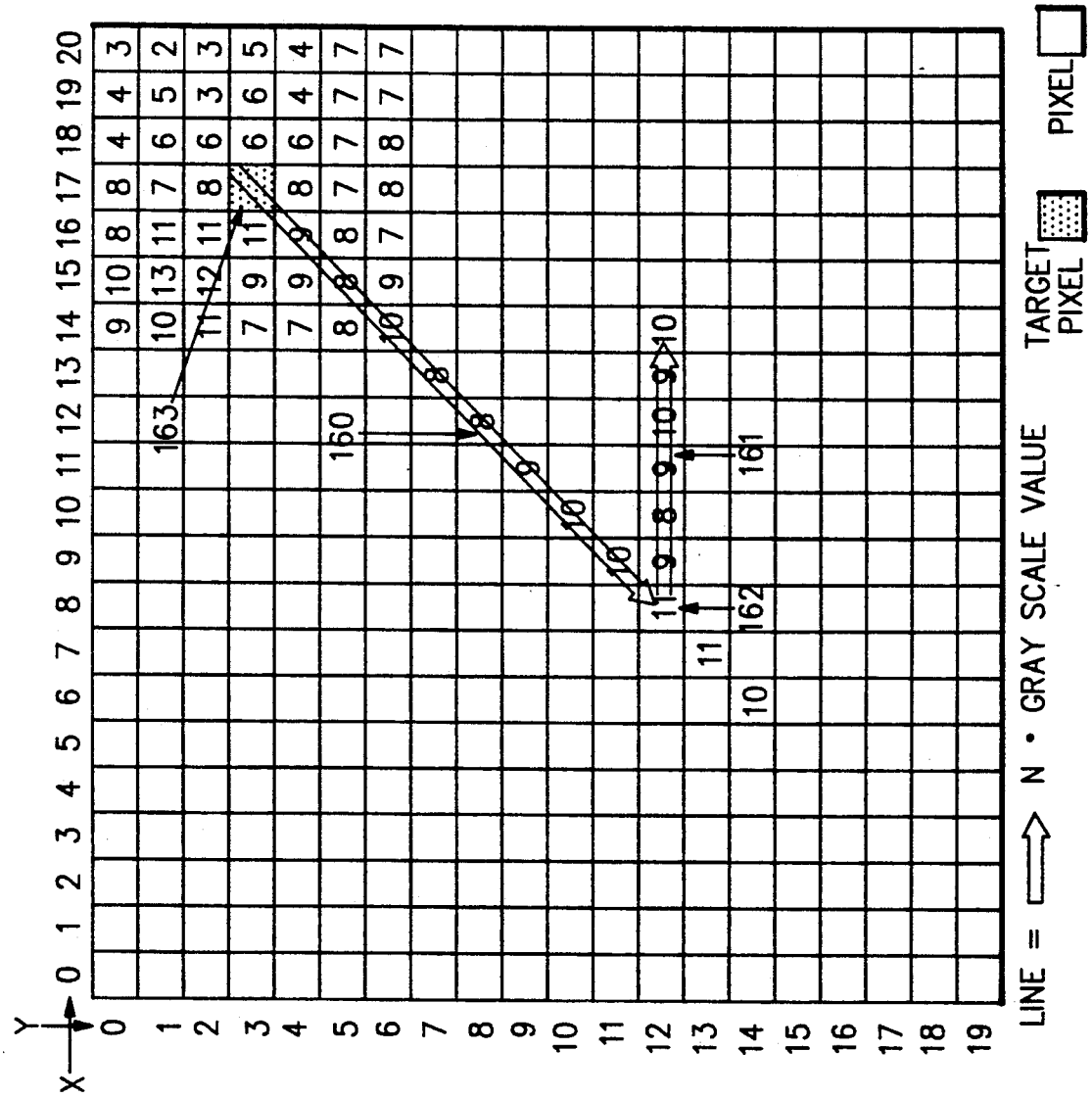
FIG. 15 shows two contiguous lines in an image for line extraction pixel evaluation for line extraction.

The "Line Extraction" algorithm evaluates edges extending from the target pixel in any direction which form a progressive set of contiguous edges. The end of the line is the point at which the contiguous edges change direction 90 degrees or more. This algorithm has been included in 3 FIGS. 12-14 to facilitate the steps necessary to ascertain the beginning of a line (FIG. 12 #110-123), and, if a line is found (FIG. 13 #130-145), to follow the line to determine if any changes in direction greater than 89 degrees have occurred; thus indicating the end of the line (FIG. 14 #150-157). An example of "Line Extraction" is shown in the "Line Extraction Pixel Diagram" in FIG. 15 #160-163 wherein the beginning and ending of the line #160 is shown to be pixel x-17, y-3 (the target pixel) and pixel x-8, y-12, the pixel at which a change of direction greater than 89 degree takes place. A new line begins at #162 and continues on as line #161 in the direction of the arrow to end at pixel x-14, y-12. Using the "Line Extraction" algorithm, a square would then have 4 lines resulting from 4 changes in direction of 90 degrees or greater while a circle would be comprised of only one line based upon changes in direction of less than 90 degrees. Specifically, the algorithm creates a string of bits, where each bit represents each pixel contained in the line. As shown in the actual "Line Extraction Calculation Diagram" in FIG. 16, the string of bits contains "zeros" where no change in direction from pixel to pixel has occurred and "ones" where a change in direction has occurred. Two numbers result from these calculations: the first is the length of the line, i.e. the number of pixels contained in the line which is designated as "String Length" in FIG. 16; and the second, the number of changes in direction in the line, i.e. the number of "ones" in the bit string (see FIG. 16, column 6). When these numbers and bit strings are used to form a "Geometric Knowledge Base", the numbers facilitate fast searches of this Knowledge Base for possible pattern match candidates.

Step 1

Figure 12:
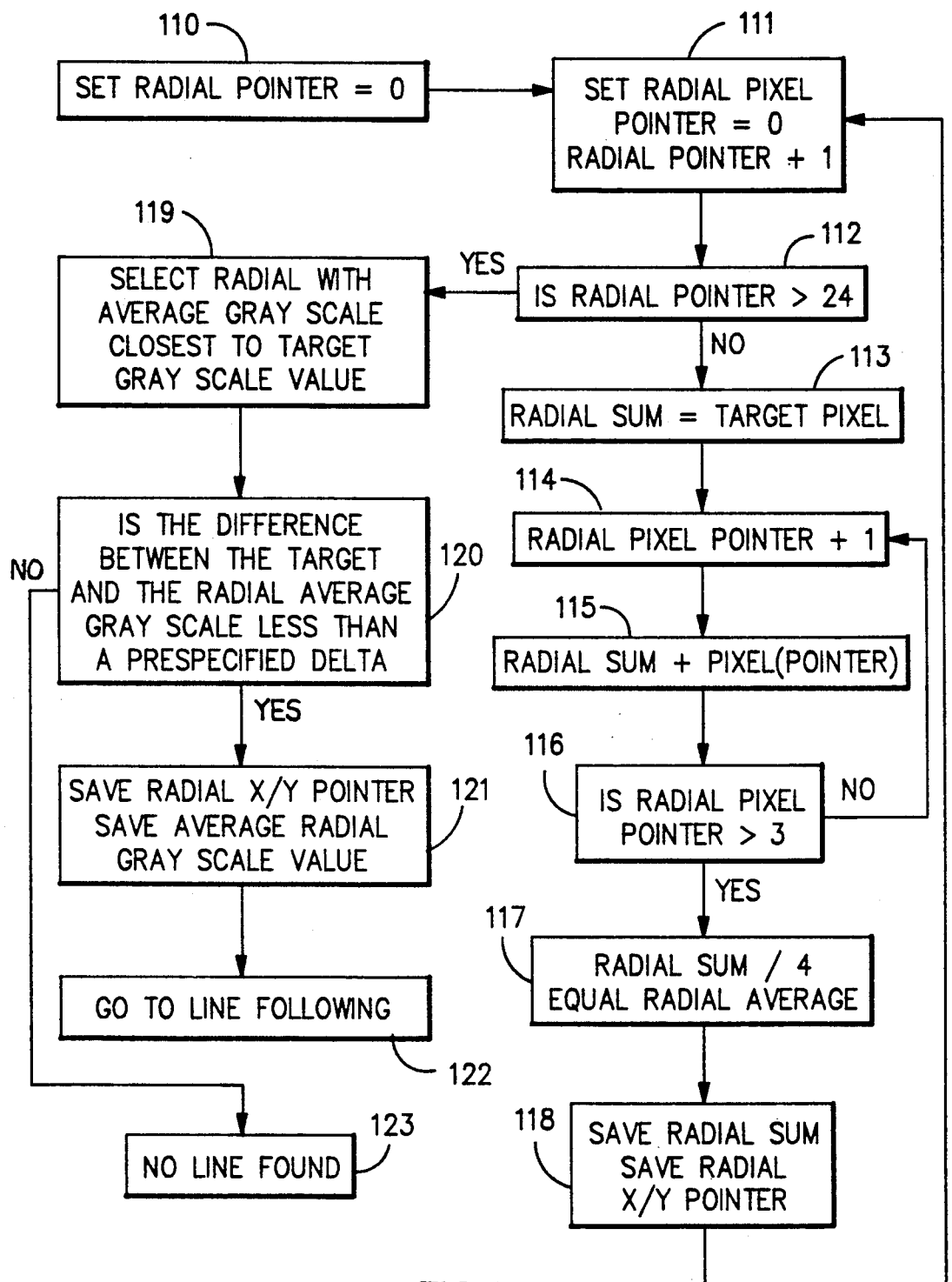
FIG. 12 shows the flow diagram for line acquisition to locate the beginning of a line in an image.

In FIG. 12, #110, the variable "Radial Pointer" is initialized to zero.

Step 2

In FIG. 12, #111, the variable "Radial Pixel Pointer" is initialized to zero and the variable "Radial Pointer" is incremented by "1" to select the next radial to be processed.

Step 3

In FIG. 12, #112, the variable "Radial Pointer" is tested for greater than "24". If the test is true, all possible radial directions have been processed; proceed to Step 10. Otherwise, go to Step 4.

Step 4

In FIG. 12, #113, the variable "Radial Sum" is initialized to the Gray-scale value contained in the target pixel.

Step 5

In FIG. 12, #114, the variable "Radial Pixel Pointer" is incremented by "1" to point to the next pixel to be processed.

Step 6

In FIG. 12, #115 the Gray-scale value of the selected pixel is added to the variable "Radial Sum".

Step 7

In FIG. 12, #116, the variable "Radial Pixel Pointer" is tested for greater than "3". If the test is true, proceed to Step 8. Otherwise, go to Step 5 and process the next pixel.

Step 8

In FIG. 12, #117, divide the contents of the variable "Radial Sum" by "4" and place the results in the variable array "Radial Average" in the location within this array selected by the variable "Radial Pointer".

Step 9

In FIG. 12, #118, place the contents of the variable "Radial Sum" in the variable array "Radial Sum" in the location within this array selected by the variable "Radial Pointer". Calculate the radial X/Y pointer using the variables "Radial Pointer" and "Radial Pixel Pointer" and place the results in the variable array "Radial X/Y Pointer" in the location within this array selected by the variable "Radial Pointer". Go to Step 2.

Step 10

In FIG. 12, #119, select the element, i.e., radial within the array "Radial Average" with the value closest to the target Gray-scale value.

Step 11

In FIG. 12, #120, calculate the unsigned absolute difference between the Gray-scale value of the element selected in Step 10 and the Gray-scale value of the target pixel. If the difference is greater than a prespecified delta, then no line has been detected; proceed to Step 14. Otherwise, proceed to Step 12.

Step 12

Figure 13:
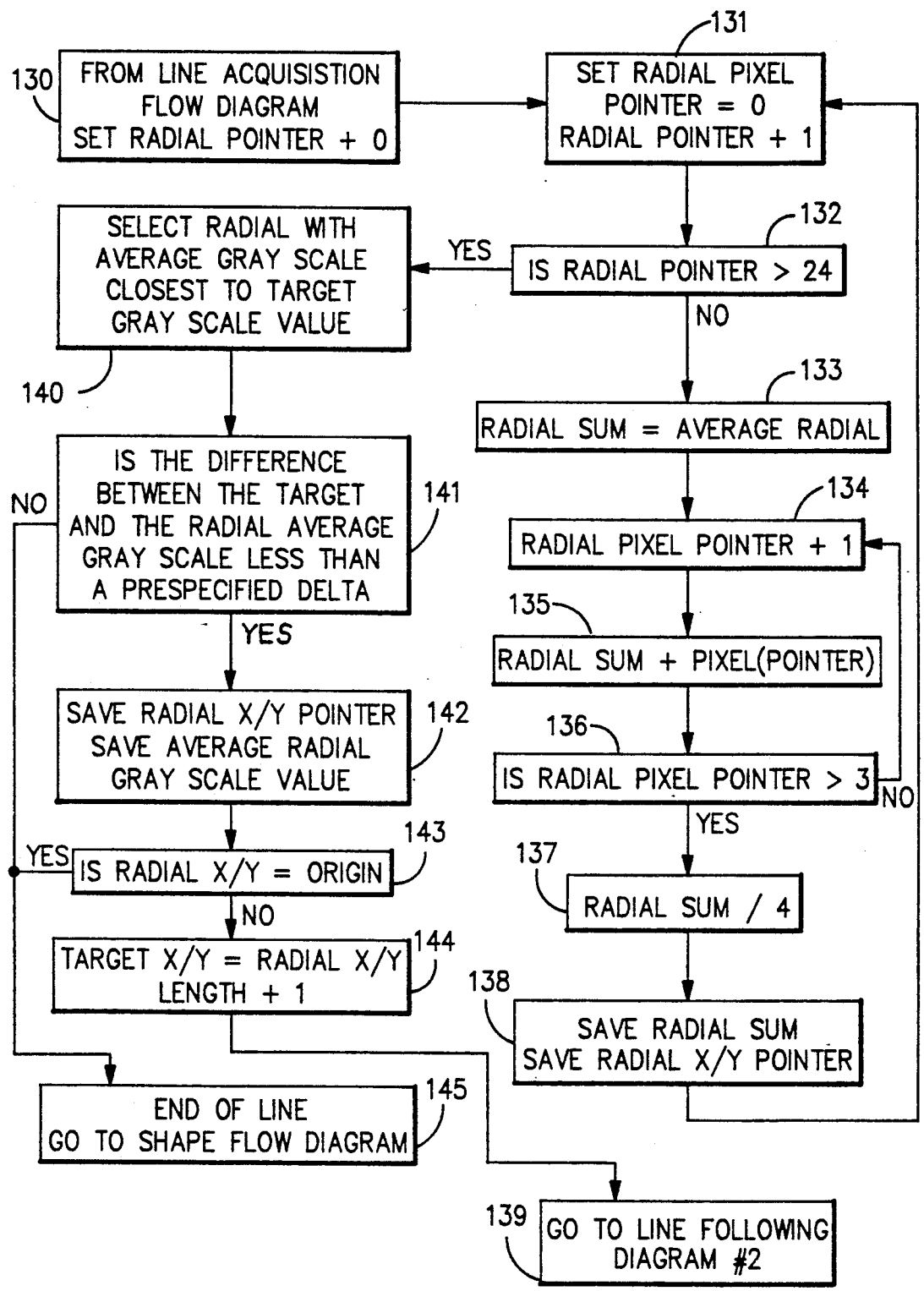
FIG. 13 shows a line following flow diagram to follow a line in an image and measure the line length and number of changes in direction contained in the line wherein each change in direction must be less than ninety degrees.

In FIG. 12, #121, the selected elements in the arrays "Radial X/Y Pointer" and "Radial Average" are saved to be passed to the "LINE FOLLOWING FLOW DIAGRAM #1" FIG. 13 #130.

Step 13

In FIG. 12, #122, a line has been detected; go to the "LINE FOLLOWING" STEP-BY-STEP EXPLANATION (FIG. 13, #130).

Step 14

In FIG. 12, #123, no line has been detected. If all pixels in the selected image array have not been processed, then select the next sequential pixel and go to Step 1. Otherwise, the algorithm has been completed.

In FIG. 13, the "LINE FOLLOWING FLOW DIAGRAM #1" is shown. This algorithm uses the information passed to it from the "LINE ACQUISITION" algorithm to follow the contiguous groups of pixels which form a line until the end of the line is detected. The end of the line is defined as a point at which the line changes direction 90 degrees or more; the point of origin has been reached, i.e., a circle which is a shape containing only one line; a contiguous set of pixels with the appropriate Gray-scale can no longer be detected, i.e., the line continuity has been broken. A string of bits, one bit per pixel, is generated. A zero is appended to the accumulated bit string for each pixel along the line where no change in direction has been detected, i.e., this portion of the line is straight, and a "1" is appended to the accumulated bit string for each pixel along the line where a change in direction is detected. The length of the resultant accumulated bit string, i.e., the number of bits in the string, is equal to the number of pixels in the line.

"LINE FOLLOWING" ALGORITHM (FLOW DIAGRAM "1")—STEP-BY-STEP EXPLANATION

Step 1

In FIG. 13, #130, the variable "Radial Pixel Pointer" is initialized to zero.

Step 2

In FIG. 13, #131, the variable "Radial Pixel Pointer" is initialized to zero. The variable "Radial Pointer" is incremented by "1" to select the next radial to be processed. The variable "Radial Pointer" is incremented by "1" to select the next radial to be processed.

Step 3

In FIG. 13, #132, the variable "Radial Pointer" is tested for greater than "24". If the test is true, then all radials have been processed; proceed to Step 10. Otherwise, proceed to Step 4.

Step 4

In FIG. 13, #133, the contents of the variable "Average Radial" is placed into the variable "Radial Sum".

Step 5

In FIG. 13, #134, the variable "Radial Pixel Pointer" is incremented by "1" to select the next pixel to be processed.

Step 6

In FIG. 13, #135, the Gray-scale value of the selected pixel is added to the variable "Radial Sum".

Step 7

In FIG. 13, #136, the variable "Radial Pixel Pixel Pointer" is tested for greater than "3". If the radial have been processed; proceed to Step 8. Otherwise, proceed to Step 5.

Step 8

In FIG. 13, #137, the contents of the variable "Radial Sum" is divided by "4" to calculate the average Gray-scale along the radial being processed.

Step 9

In FIG. 13, #138, save the results of the calculation in Step 8 in the element of the variable array "Radial Average" selected by the variable "Radial Pointer". Save the contents of the variable "Radial X/Y Pointer" in the element of the variable array "Radial X/Y Pointer" selected by the variable "Radial Pointer". Go to Step 2.

Step 10

In FIG. 13, #140, select the element within the variable array "Radial Average" with a value closest to the target Gray-Scale value.

Step 11

In FIG. 13, #141, calculate the unsigned absolute difference between the Gray-scale value of the element selected in Step 10 and the Gray-scale value of the target pixel. If the difference is greater than a prespecified delta, then no line has been detected; proceed to Step 15. Otherwise, proceed to Step 12.

Step 12

In FIG. 13, #142, the selected elements in the arrays "Radial X/Y Pointer" and "Radial Average" are saved to be passed to the "LINE FOLLOWING FLOW DIAGRAM #2" FIG. 14 #150.

Step 13 in FIG. 13, #143, the variable "Radial X/Y Pointer" is tested for equal to point of origin. If the test is true, a shape made up of a single line has been detected and thus "LINE FOLLOWING" is completed. Go to "SHAPE EXTRACTION FLOW DIAGRAM" FIG. 17, #182. Otherwise, go to Step 14.

Step 14

In FIG. 13, #144, set the variable "Target X/Y Pointer" equal to the contents of the selected element in variable array "Radial X/Y Pointer. Increment the variable "Length" by "1". Go to Step 15.

Step 15

In FIG. 13, #139, go to "LINE FOLLOWING FLOW DIAGRAM #2", FIG. 14, #150.

Step 16

Figure 17:
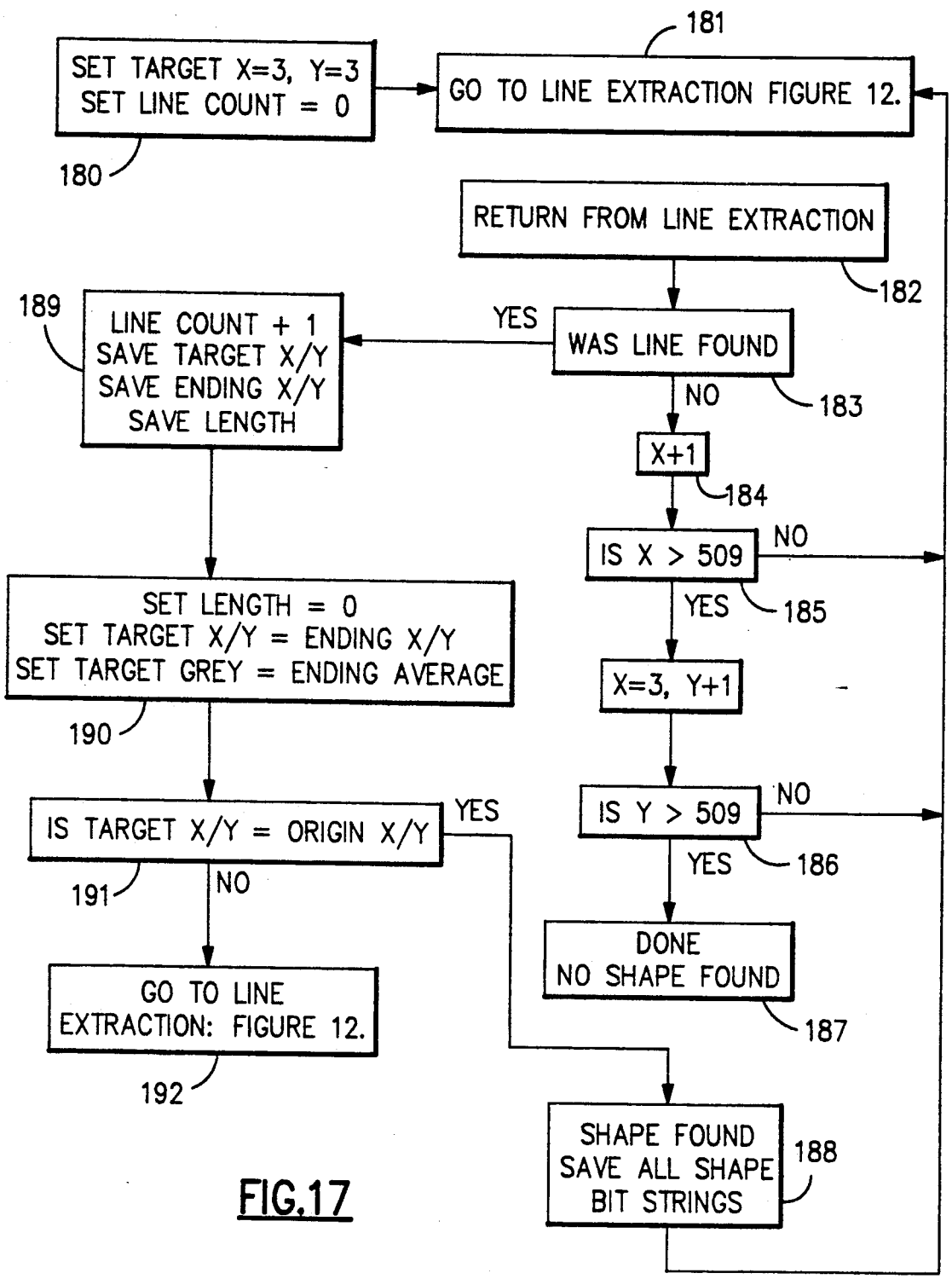
FIG. 17 shows a flow diagram for geometric shape extraction utilized in the present invention to encode the geometric shape into a set of bit strings describing the number of direction changes for each line and the length of each line contained in the geometric shape.

In FIG. 13, #145, the end of line has been detected; go to "SHAPE EXTRACTION FLOW DIAGRAM" FIG. 17, #182.

7. "LINE FOLLOWING" FLOW DIAGRAM #2—STEP-BY-STEP EXPLANATION Step 1.

FIG. 14, #150, is the entry point from "LINE FOLLOWING" DIAGRAM #1.

Step 2 in FIG. 14, #151, test X/Y pointer of target pixel found for a change in direction. If the test is true, proceed to Step 3. Otherwise, proceed to Step 7.

Step 3

In FIG. 14, #152, test for change greater than 89 degrees. If the test is true, then an end of line has been detected; go to Step 4. Otherwise, go to Step 5.

Step 4

In FIG. 14, #154, end of line has been detected; go to "SHAPE EXTRACTION FLOW DIAGRAM" FIG. 17, #182.

Step 5

In FIG. 14, #153, append a "1" to the accumulated bit string representing the current line being followed.

Step 6

In FIG. 14, #155, go to "LINE FOLLOWING FLOW DIAGRAM #2" FIG. 13, #130.

Step 7

In FIG. 14, #156, append a "0" to the accumulated bit string representing the current line being followed.

Step 8

In FIG. 14, #157, go to "LINE FOLLOWING FLOW DIAGRAM #2" FIG. 13, #130.

"GEOMETRIC SHAPE EXTRACTION"

Figure 18:
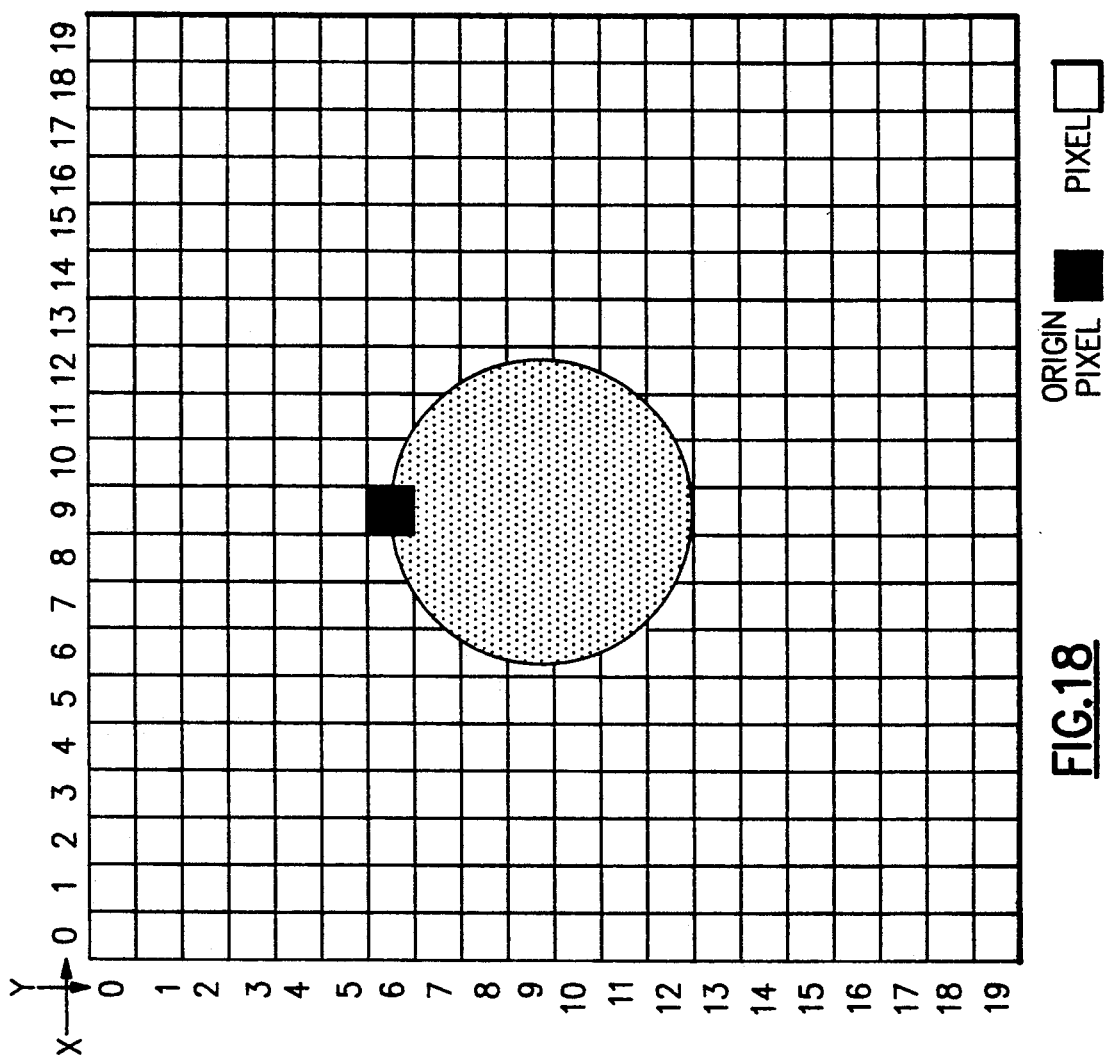
FIG. 18 shows a pixel diagram of a circle.
Figure 20:
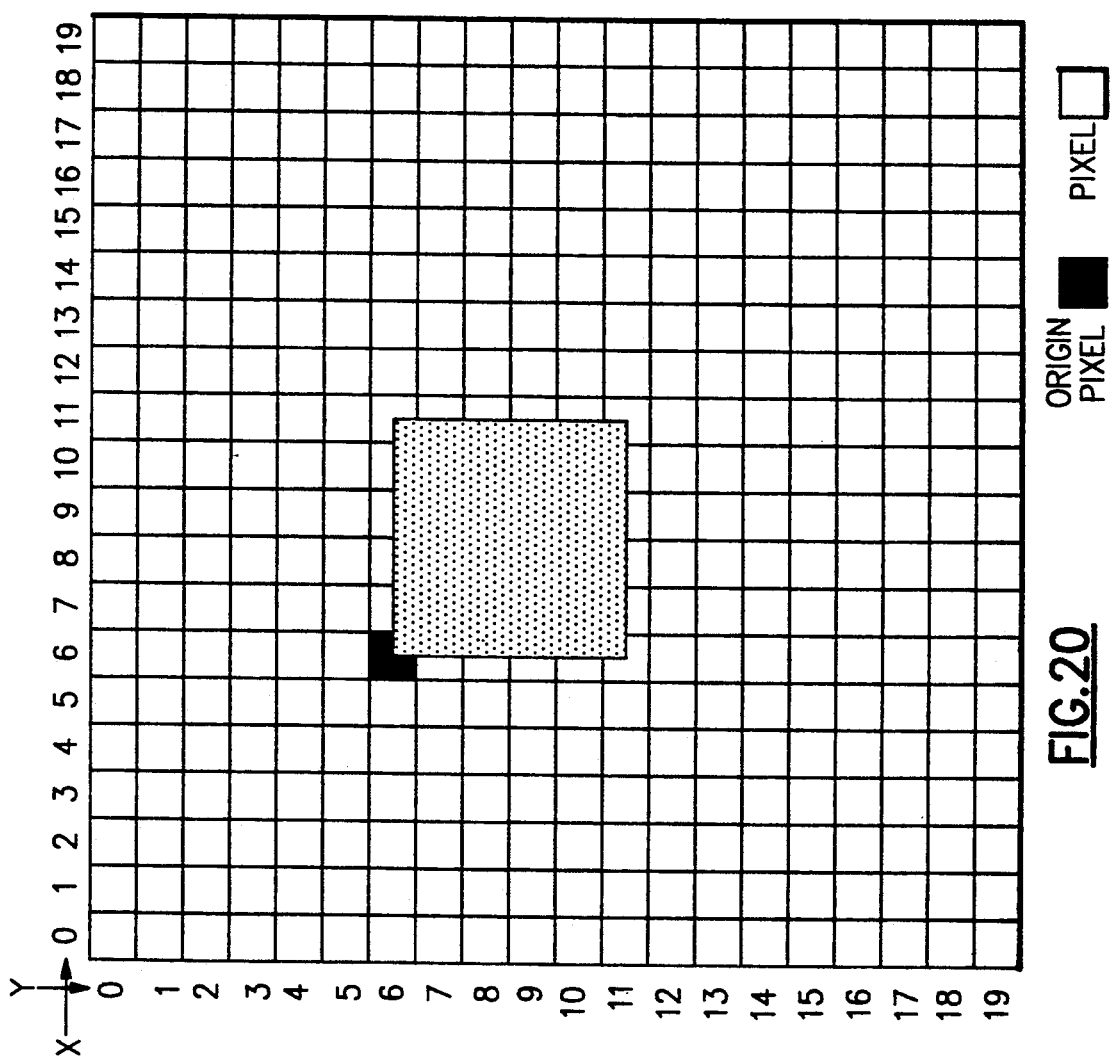
FIG. 20 shows a square shape pixel diagram.
Figure 22:
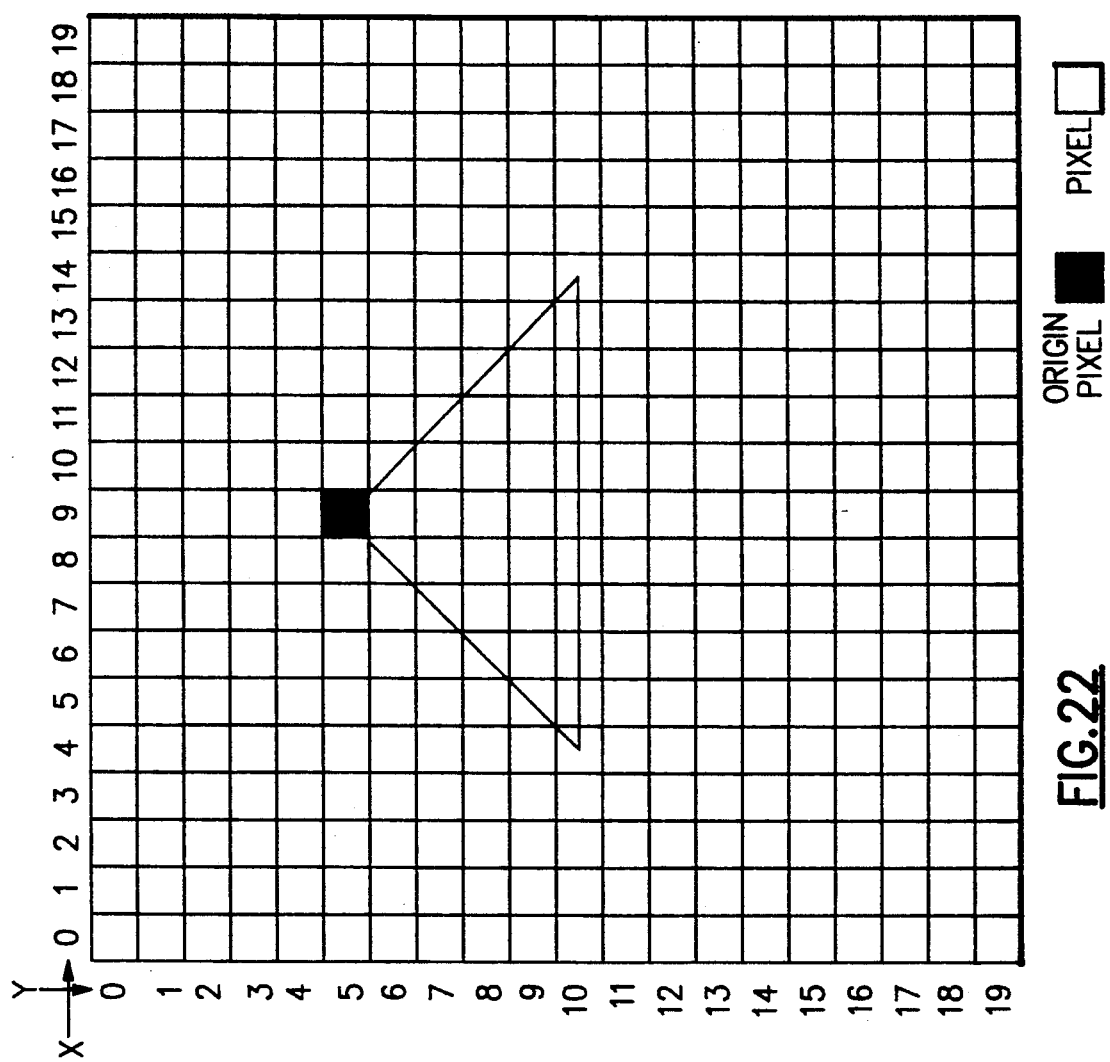
FIG. 22 shows a triangular shape pixel diagram.

The "Geometric Shape Extraction" algorithm uses the "Line Extraction" algorithm to create a series of bit strings, one for each line contained in the shape, to define the shape being extracted. This is shown in the "Shape Extraction Flow Diagram" in FIG. 17 #180-192. A shape is a group of contiguous lines that meet at the point of origin. For example, FIG. 18 shows the pixel of origin (colored block) to be also the last pixel in a line which forms a circle. FIG. 19, which is the "Circle Shape Calculation Diagram", shows that there is a line count of only one for a circle and also gives the line length and direction changes expected for a circle, which are summed up as the accumulated bit pattern shown in column 5. In like manner, the algorithm can be used to determine other shapes such as a square (see FIG. 20), which can be observed to have 4 lines as shown in the "Square Shape Calculation Diagram" in FIG. 21; and a triangle (FIG. 22), which can be calculated by this algorithm to have 3 lines. This information is shown in the "Triangle Shape Calculation Diagram" in FIG. 23. The numbers and bit strings extracted by the "Line Extraction" algorithm describe, in an abstract sense, the characteristics of each line contained in the shape. These numbers and bit strings are appended together to define a shape. For the purpose of high speed comparison candidate searches in a "Knowledge base" using this type of data, a set of composite numbers is calculated and appended to the overall group of numbers and bit strings which define the shape. The composite numbers calculated indicate the number of lines contained in the shape, the size of the shape expressed in pixels, and the total number of changes in directions contained in the shape.

"GEOMETRIC SHAPE EXTRACTION FLOW DIAGRAM "STEP-BY-STEP EXPLANATION

Step 1

In FIG. 17, #180, the variables "Target X" and "Target Y" are indexed by "3" to avoid transgressing the outer edges of the image to be processed. The variable "Line Count" is initialized to zero.

Step 2

In FIG. 17, #181, the target pixel coordinates and processing control is passed to the "LINE EXTRACTION" routine (FIG. 12, #110) via a call.

Step 3

In FIG. 17, #182, parameters and processing control are returned to this routine from the "LINE EXTRACTION" routine via a return.

Step 4

In FIG. 17, #183, a test for line found is performed. If the test is true, then go to Step 10 to save the parameters. Otherwise, go to Step 5.

Step 6

In FIG. 17, #184, the variable "Target X" is incremented by "1" to select the next target pixel for a line search.

Step 6

In FIG. 17, #185, the variable "Target X" is tested for greater than "509" which is the end of the image array along the "X" axis. If the test is true, set the variable "Target X" to "3" and increment the variable "Target Y" by "1" to select the next line in the image array to be processed and proceed to Step 7. Otherwise, proceed to Step 2.

Step 7

In FIG. 17, #186, the variable "Target Y" is tested for greater than "509" which is the end of the image array along the "Y" axis. If the test is true, no shape is found; then proceed to Step 8. Otherwise, proceed to Step 2 and continue the search.

Step 8

In FIG. 17, #187, no geometric shape has been detected in this portion of the search. Then return to the calling routine.

Step 9

In FIG. 17, #188, a geometric shape has been found; pass all "Line Count", "Target X/Y", "Ending X/Y", bit string "Length", and "Bit Strings" parameters found in the shape.

Step 10

In FIG. 17, #189, increment the variable "Line Count" by "1" to indicate that a line has been found. Save the variables "Target X/Y", Ending X/Y", and "Length" to be passed to the calling routine in Step 9.

Step 11

In FIG. 17, #190, set the variable "Length" equal to "0"; set the variable "Target X/Y" equal to the variable "Ending X/Y"; set the "Target Gray-scale" to the "Ending Average Gray-scale".

Step 12

In FIG. 17, #191, test the variable "Target X/Y" equal to the variable "Origin X/Y". If the test is true, the beginning point of the search has been reached and a shape has been detected. Then go to Step 9. Otherwise, go to Step 13.

Step 13

In FIG. 17, #192, thus far only one or more lines have been detected. Go to "LINE EXTRACTION" FIG. 12, #110 and continue searching the next line.

"GEOMETRIC SHAPE AND PATTERN RECOGNITION"

Figure 24:
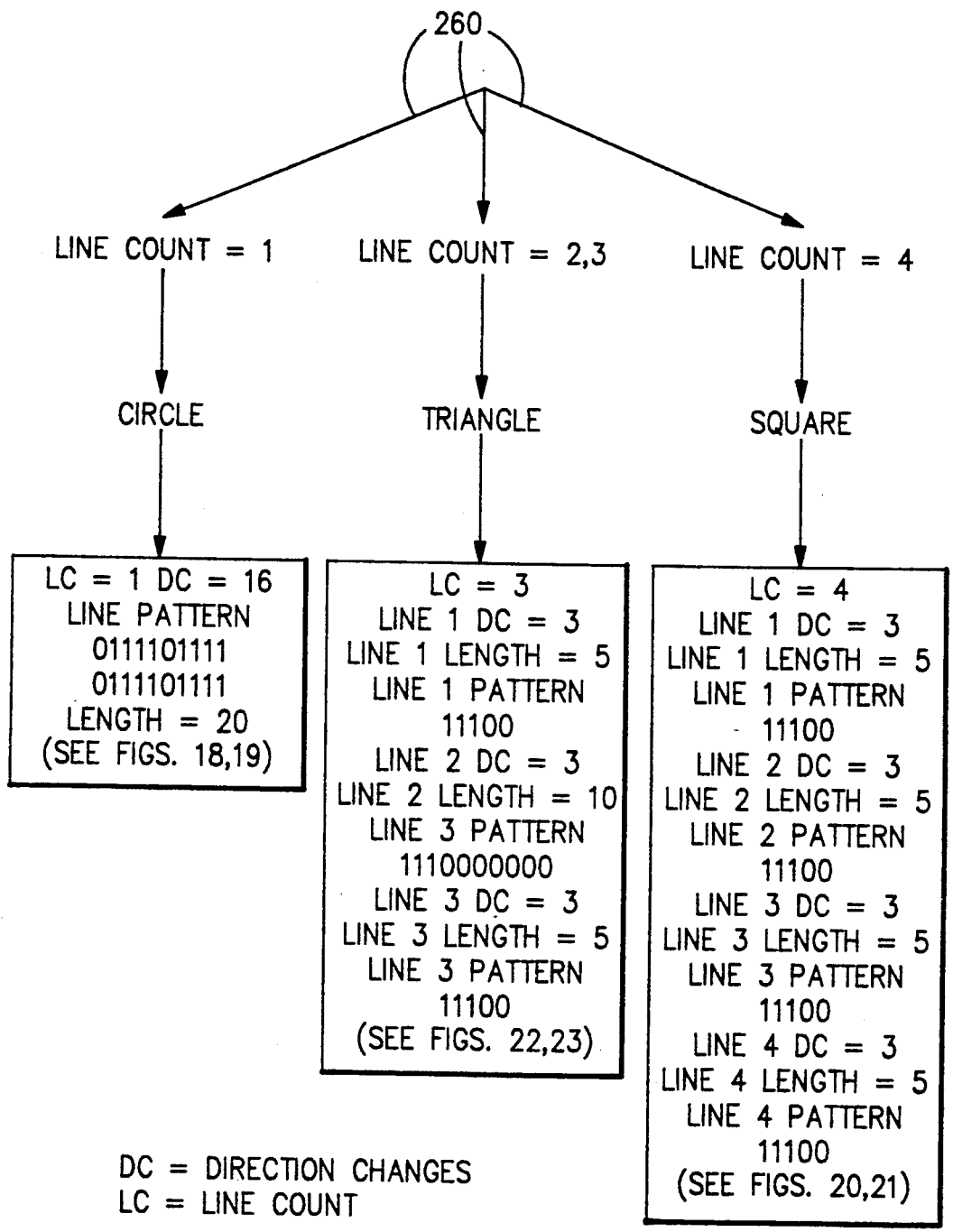
FIG. 24 shows a schematic diagram of a geometric shape recognition knowledge tree utilizing circular, triangular and square pixel images for storage in a knowledge base.

Using the "Line Extraction" (FIGS. 12-14) and "Geometric Shape Extraction" (FIG. 17) algorithms, a root knowledge base can be generated. This stored knowledge base describes in an abstract sense various geometric shapes and patterns. The knowledge base data is stored in logic tree format based on the line count and the number of direction changes in that order. FIG. 24 shows such a knowledge base containing a circle, a rectangle, and a triangle. Each major category of geometric shapes becomes a main branch of the logic tree (FIG. 24 #260). The major categories are based on the line count contained in the shape. Minor categories then become minor branches of the major branches based on the number of changes in direction contained in the shape.

ASSUME: The target image contains a triangle identical in size to the triangle stored in the knowledge tree.

Step 1

Extract the geometric shape from the target image. The extraction yields a Line-Count of "3", a Direction Change of "0", a size of "12", and a shape Line pattern table of 000,000000,000.

Step 2

Select the major branch in the knowledge tree using the Line-Count value from the target shape extraction. This value is "3" and therefore yields a selection of the branch for a triangle.

Step 3

Select the minor branch in the triangle knowledge tree branch using the Direction changes value from the target shape extraction. This value is "0" and the shape is therefore a triangle made up of three straight lines; there is no minor branch.

Step 4

If the size of the target is not equal to the size of the selected knowledge tree candidate, perform a size adjustment on the larger of the two. In this example, the sizes are equal and no adjustment is necessary.

Step 5

Perform a bit by bit comparison between the target Line Pattern Table and the knowledge tree Line Pattern Table. Calculate the percentage of match score for the candidate based on the number of bits that are equal.

Once a geometric shape has been extracted from a target image using the "Geometric Shape Extraction" algorithm, the resultant line count and changes in direction can then be used to search the knowledge tree to select bit pattern match candidates. The size of each candidate or the target, depending on which bit pattern is larger, is adjusted to match the size of the other by removing every N-th bit from the larger of the two. The bit patterns contained in these candidates are then compared on a bit by bit basis with the target image shape extracted. A percentage score is then calculated for each candidate based on the number of bits in the respective bit pattern tables that match. The candidate with the highest score is selected as the best match from the knowledge base and is assumed to be the closest geometric approximation to the target shape.

The instant invention has been shown and described herein in what is considered to be the most practical and preferred embodiment. It is recognized, however, that departures may be made therefrom within the scope of the invention and that obvious modifications will occur to a person skilled in the art.

Figure 25:
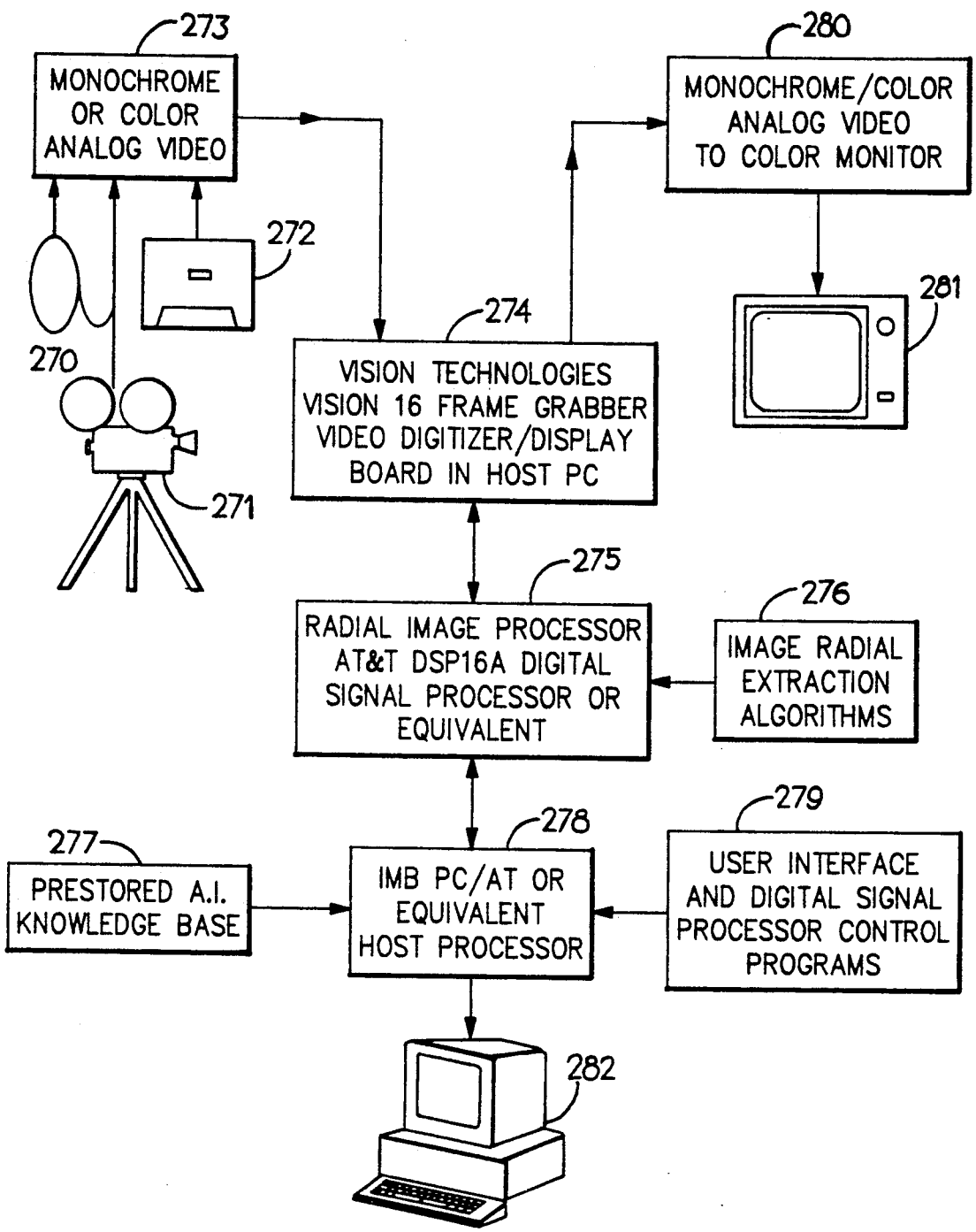
FIG. 25 is a schematic diagram of a system using applicant's invention.

FIG. 25 is a schematic diagram of a system using applicant's invention. FIG. 25, box 273, depicts an analog video input, monochrome or color, which could be received from any one of a myriad of imaging devices which can include, but is not limited to, an ultrasound machine 270, radar systems, sonar systems, a film video system 271, a video cassette tape system 272, videocameras, and the like. FIG. 25, box 274, depicts an image digitizer and display board, "Vision Technologies Model Vision 16 Frame Grabber Video Digitizer/Display Board", which is currently utilized in the preferred embodiment of the invention. The digitizer/display board 274 converts the incoming analog image information into digital picture elements (pixels) comprising a 512 horizontal by 512 vertical matrix of pixels which represent one complete frame of the incoming image information from video 273. Monitor 280 depicts the digital to analog image stream of information acceptable to CRT display device 281. Box 275 shows an AT&T DSP16A digital signal processor board, which is used to process the array of pixels contained in the Vision 16 Frame Grabber Board 274. Box 276 depicts the software image pattern extraction and recognition algorithms used by the DSP16A digital signal processor to extract and recognition algorithms used by the DSP16A digital signal processor to extract and evaluate the image patterns contained in the current frame being processed. These algorithms are outlined in detail in FIGS. 3–24 and are described in the specification herein. Processor 278, the IBM PC/AT host processor, then takes the information provided by the aforementioned image pattern extraction and recognition algorithms and searches the prestored artificial intelligence (A.I.) knowledge base element 277 for the best, if any, match candidates and provides information to the DSP16A for the colorization and/or manipulation which are used as visual indication to the observer/operator of the area of interest in the target being imaged. The host processor, 278, also provides the human/user interface and control depicted in element 279. Interface is accomplished through the trackball, keyboard, and display 282.

I claim:

1. An image processing method for rapidly selecting pattern information from a pixel generated image, each pixel having a gray scale value, comprising the steps of:
    (a) selecting a target pixel relating to target image to be evaluated;
    (b) selecting a first group of pixels directly surrounding said target pixel;
    (c) selecting a second group of pixels surrounding contiguously said first group of pixels;
    (d) assigning one or more radials from said target pixel through at least one pixel of said first group and continuously through at lest one pixel of said second group;
    (e) determining the pixel gray scale values along each radial in group one and group two to determine the number of edges along each radial;
    (f) providing a bit string whose length is based on the number of edges in each radial; and
    (g) accumulating all radial bit string values into an accumulated string of bits relating to the radial shape of the edges.

2. A method for extracting pattern information from edge radial spatial distribution relating to an image of pixels in x and y coordinates as in claim 1 comprising the additional steps of:
    (h) counting the number of "0" bits in each accumulated bit string;
    (i) assigning a numerical value to the resultant "0" bit count relating to the spatial distribution of edges.

3. A method as in claim 2 for radial contour extraction of the pixel target image comprising the additional steps of:
    (j) identifying the gray scale pixel value differences on each radial between the target pixels and the edge pixels;
    (k) summing the total absolute gray scale pixel value differences for all radials relating to the target pixel, whereby the resultant total pixel gray scale differential value indicates image homogeneity around said target pixel.

4. A method for extracting pattern recognition information from a pixel image formed by an x and y coordinate pixel array, each pixel having a gray scale value, comprising the steps of:
    (a) selecting a target pixel in said pixel array;
    (b) delineating matched pairs of colinear radials originating from said target pixel, each of said colinear paired radials being at least three pixels in length;
    (c) determining the gray scale pixel value differences between each pair of colinear radials as an absolute numerical value; and
    (d) accumulating the total gray scale pixel values differences for all colinear radial pairs to ascertain the total gray scale pixel asymmetry surrounding said target pixel relating to the echoic asymmetry of an image pattern around the target pixel.

5. A method of image processing for pattern recognition from a pixel image array in x and y coordinates for radial gradient extraction as in claim 1 in order to measure gradual changes in echogenicity comprising the additional steps of:
    (h) adding the absolute value of gray scale values of at least three pixels along each radial;
    (i) determining the difference in total gray scale values between adjacent radials;
    (j) summing the total of the absolute differences in adjacent radial gray scale values to obtain a final accumulated gradient value.

6. A method for extracting lines from an image formed by a plurality of pixels in an x and y coordinate image pixel array comprising the steps of:
    (a) selecting a target pixel;
    (b) selecting a plurality of target radials emanating from said target pixel;
    (c) determining a radial with an average pixel gray scale value within a predetermined value relative to said target pixel gray scale value along said radial;
    (d) assigning a bit value to each pixel located in a line as determined along said radial;
    (e) locating a change in direction of said line above 89°;
    (f) accumulating a bit string for each bit value assignment.

7. A method for pattern recognition in image processing for use with an image formed by a pixel array in x and y coordinates for geometric shape extraction as in claim 6, including the steps of:
    (g) searching each accumulated bit string for a line identification at each pixel location;
    (h) examining each line to determine when the pixel location coincides with a point of origin of said line; and
    (i) continuing said line examination for all pixels until the target pixel coincides with said point of origin, whereby a shape will be extracted.

8. An image processing method for pattern recognition from a pixel image array in x and y coordinates for geometric shape and pattern recognition as in claim 6:
    (g) generating a logic tree knowledge base on line count and number of direction changes for recognition of geometric shapes based on the number of changes in direction and shape;
    (h) searching the knowledge tree data using resultant line count and changes in direction to select bit pattern match candidates;
    (i) adjusting the size of each match candidate by removing every N-th bit from the larger of the two;

(j) comparing bit patterns on a bit by bit basis with the target image shape extracted.

9. An apparatus for the extraction of pattern recognition information from a pixel image containing back scatter energy produced by a focused beam of energy (radar, sonar, ultrasonic, laser) emitted against a target such as human tissue to extract characteristic information concerning tissue being targeted, the apparatus comprising:

means for generating a beam of ultrasonic energy;

means for evaluating back scatter of said energy from a target as a function of the pixel gray scale values in a visual pixel array;

means for generating a pixel array pattern in x and y coordinates as a function of back scatter intensity energy received from a specific target illuminated with a focused beam of energy;

means for selecting a target pixel in said pixel array pattern;

means for selecting predetermined radials relative to said target pixel;

means for determining the pixel gray scale values along each radial relative to said target pixel and pixels surrounding said target pixels to determine the number of edges along each radial; and means for providing bit string volume based on the number of edges in each radial and accumulating all the radial bit string values into an accumulated string of bits relating to the radial shape of the edges.

* * * * *